(12) United States Patent
Shoji et al.

(10) Patent No.: US 8,000,197 B2
(45) Date of Patent: Aug. 16, 2011

(54) RECORDING/REPRODUCING DEVICE, RECORDING CONDITION ADJUSTING DEVICE AND RECORDING/REPRODUCING METHOD

(75) Inventors: Mamoru Shoji, Osaka (JP); Yasumori Hino, Nara (JP); Harumitsu Miyashita, Nara (JP); Isao Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 705 days.

(21) Appl. No.: 11/995,549

(22) PCT Filed: Jul. 18, 2006

(86) PCT No.: PCT/JP2006/314188
§ 371 (c)(1),
(2), (4) Date: Jan. 14, 2008

(87) PCT Pub. No.: WO2007/010905
PCT Pub. Date: Jan. 25, 2007

(65) Prior Publication Data
US 2009/0034381 A1 Feb. 5, 2009

(30) Foreign Application Priority Data
Jul. 15, 2005 (JP) .................................. 2005-207769

(51) Int. Cl.
*G11B 7/125* (2006.01)
(52) U.S. Cl. ..................................... 369/53.26; 369/116
(58) Field of Classification Search ................. 369/53.26
See application file for complete search history.

(56) References Cited

U.S. PATENT DOCUMENTS
6,791,926 B1  9/2004  Furumiya et al.
6,807,134 B2 * 10/2004  Nakajima et al. .......... 369/47.35
7,009,924 B2 *  3/2006  Morishima ................. 369/47.53
7,256,902 B1  8/2007  Morikawa et al.
2004/0264330 A1 * 12/2004  Roh ........................... 369/47.53
2005/0078579 A1  4/2005  Miyashita et al.
2005/0128911 A1 *  6/2005  Miyashita et al. .......... 369/47.53

FOREIGN PATENT DOCUMENTS
JP  2000-200418  7/2000
JP  2001-109597  4/2001
JP  2004-095018  3/2004
JP  2005-158245  6/2005

OTHER PUBLICATIONS

T. Nishida et al., "Sn-Sb-Se/Sb-Bi Bilayer Phase-Change Media for High-Density Write-Once Recording" Jpn. J. Appl. Phys. vol. 34 Mar. 1995 pp. 1562-1568, XP-002517976.
Supplementary European Search Report for corresponding application No. EP 06781201.6 issued Mar. 17, 2009.
International Search Report for corresponding Application No. PCT/JP2006/314188 dated Sep. 5, 2006.

* cited by examiner

*Primary Examiner* — Lixi C Simpson
(74) *Attorney, Agent, or Firm* — Renner, Otto, Boisselle & Sklar, LLP

(57) ABSTRACT

A calculation of a reliability value |Pa−Pb|−Pstd, representing represents a maximum likelihood decoding result on a portion which corresponds to a start or termination edge of a recording mark and has a high probability of error occurrence by a maximum likelihood decoding method, is performed on each combination of a predetermined mark length and a space length immediately before the mark and each combination of the mark length and a space length immediately after the mark. Based on the calculation result, a recording parameter is optimized, and recording reflecting the optimized recording parameter is performed.

11 Claims, 33 Drawing Sheets

FIG.3
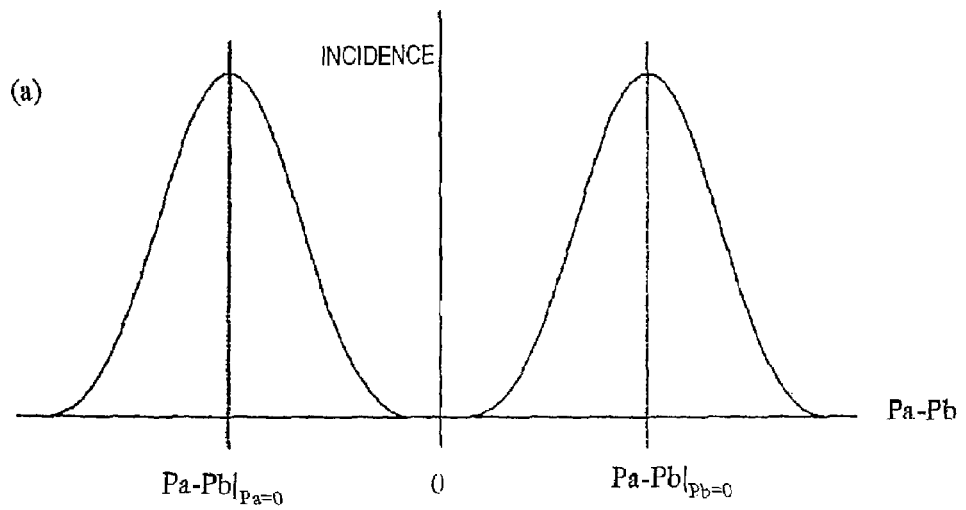
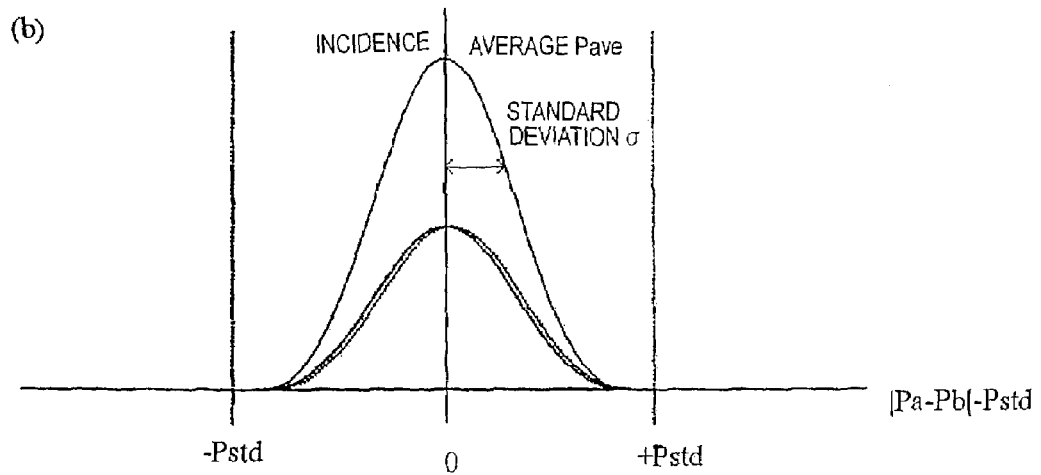

FIG.10
(a)
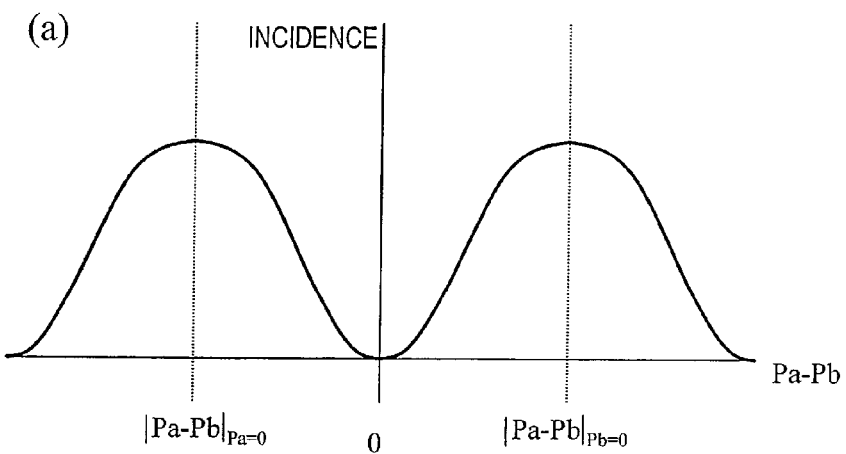
(b)
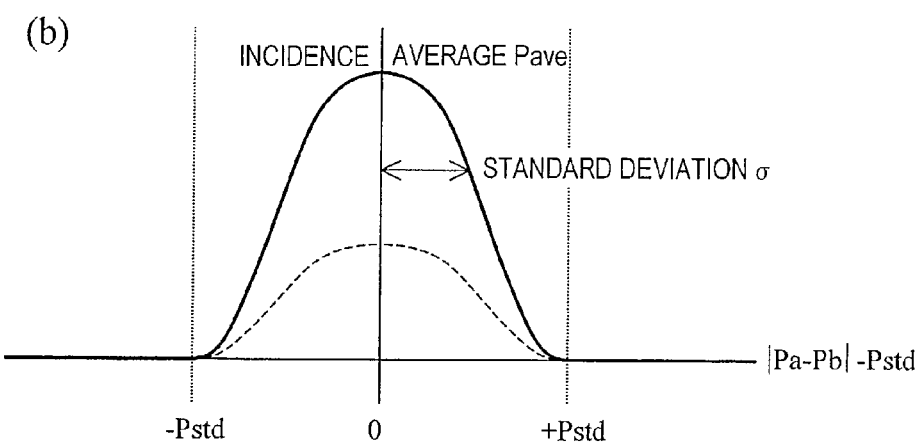

*FIG.11*
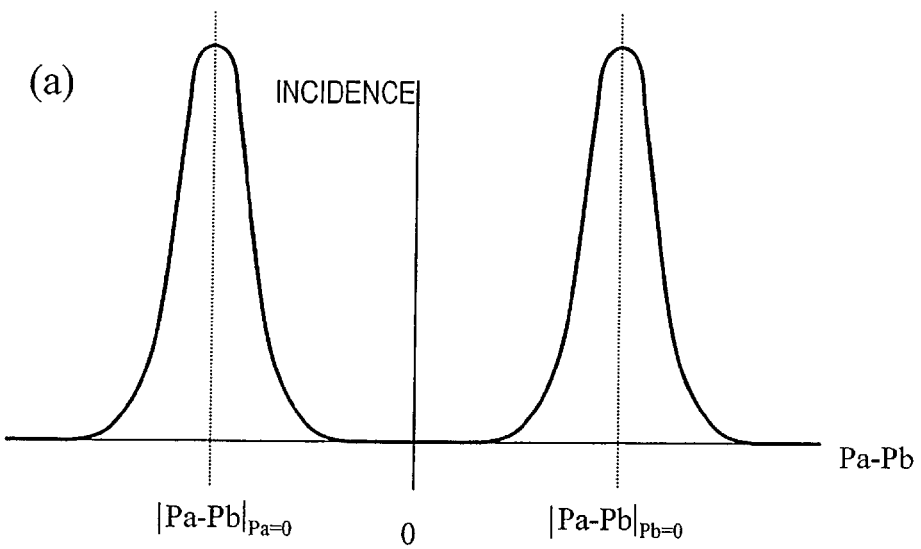
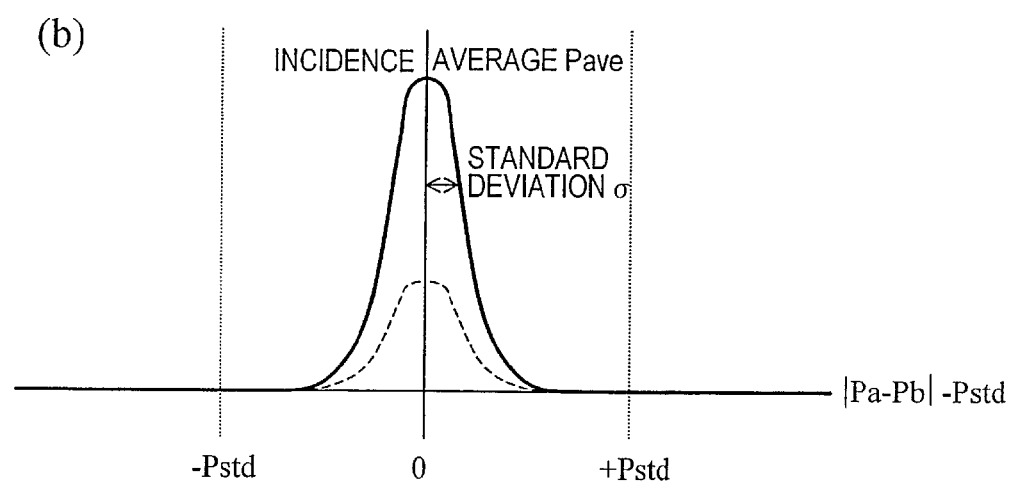

FIG.12
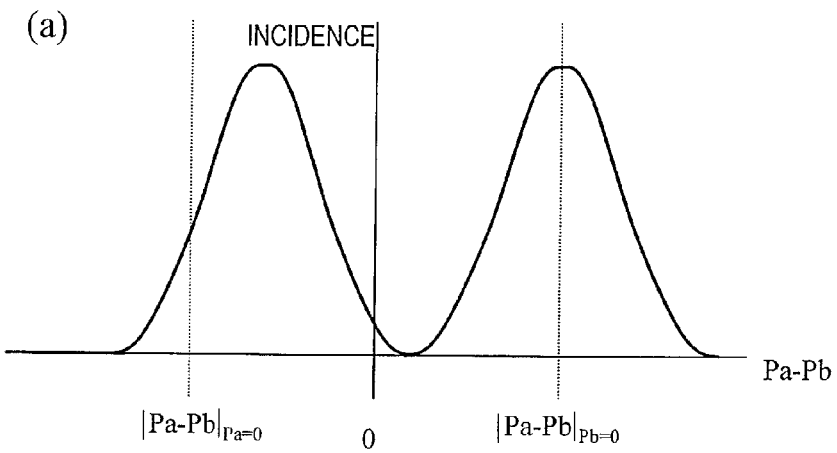
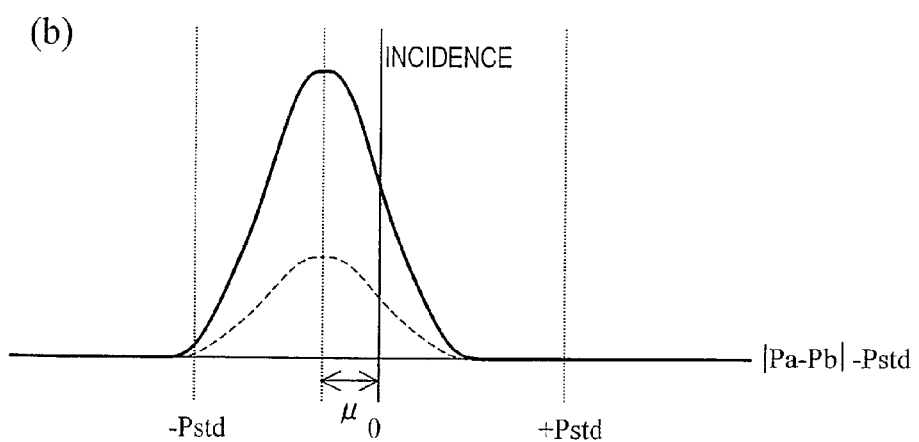

*FIG.16*

| RECORDING PATTERN FOR LEARNING |
|---|
| 2M3S2M4S2M5S3M2S3M3S3M4S3M5S4M 2S4M3S4M4S4M5S5M2S5M3S5M4S5M5S |
| 1100011000011100011100000111100111100001110000111111000111111000011111110000111111100000111111100000 |

FIG.20
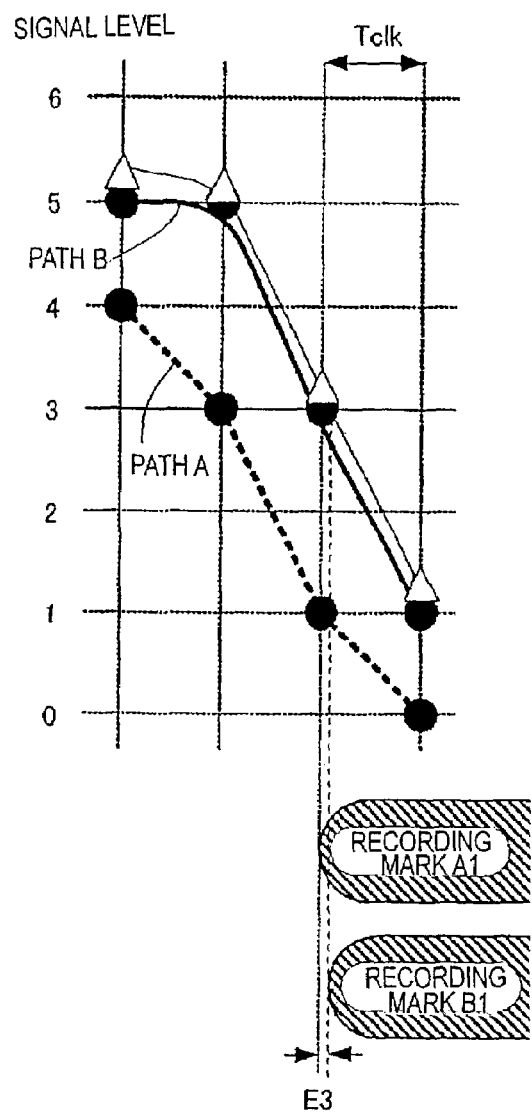
(a)
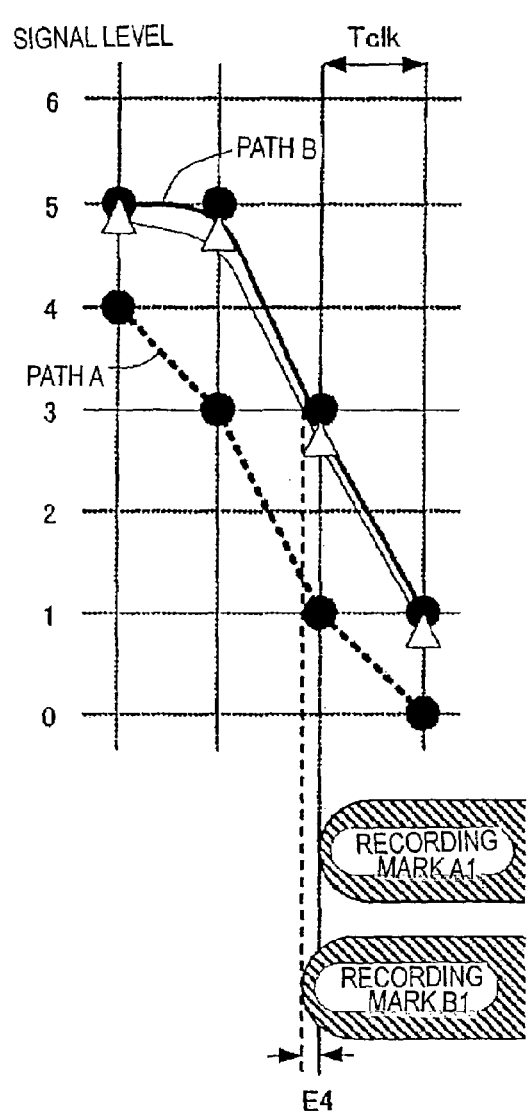
(b)

FIG.21

| Tsfp | 2Tm | 3Tm | 4Tm | 5Tm or more |
|---|---|---|---|---|
| 2Ts | 2Ts2Tm | 2Ts3Tm | 2Ts4Tm | 2Ts5Tm |
| 3Ts | 3Ts2Tm | 3Ts3Tm | 3Ts4Tm | 3Ts5Tm |
| 4Ts | 4Ts2Tm | 4Ts3Tm | 4Ts4Tm | 4Ts5Tm |
| 5Ts or more | 5Ts2Tm | 5Ts3Tm | 5Ts4Tm | 5Ts5Tm |

| Telp | 2Tm | 3Tm | 4Tm | 5Tm or more |
|---|---|---|---|---|
| 2Ts | 2Tm2Ts | 3Tm2Ts | 4Tm2Ts | 5Tm2Ts |
| 3Ts | 2Tm3Ts | 3Tm3Ts | 4Tm3Ts | 5Tm3Ts |
| 4Ts | 2Tm4Ts | 3Tm4Ts | 4Tm4Ts | 5Tm4Ts |
| 5Ts or more | 2Tm5Ts | 3Tm5Ts | 4Tm5Ts | 5Tm5Ts |

FIG.22

| Tsfp | 2Tm | 3Tm | 4Tm | 5Tm or more |
|---|---|---|---|---|
| 2Ts |  | P3A | P1A | P1A |
| 3Ts | P3B | P1B/P4A | P1B/P2A | P1B/P2A |
| 4Ts | P4B | P2B/P4A | P2B/P2A | P2B/P2A |
| 5Ts or more | P4B | P2B/P4A | P2B/P2A | P2B/P2A |

| Telp | 2Tm | 3Tm | 4Tm | 5Tm or more |
|---|---|---|---|---|
| 2Ts |  | P6A | P5A | P5A |
| 3Ts | P6B | P5B/P8A | P5B/P7A | P5B/P7A |
| 4Ts | P8B | P7B/P8A | P7B/P7A | P7B/P7A |
| 5Ts or more | P8B | P7B/P8A | P7B/P7A | P7B/P7A |

FIG.23

SENSITIVITY OF M_SN AND M_SHIFT

|  | M_SN | M_SHIFT |
|---|---|---|
| POWER ADJUSTMENT | ○ | △ |
| EDGE ADJUSTMENT | × | ○ |

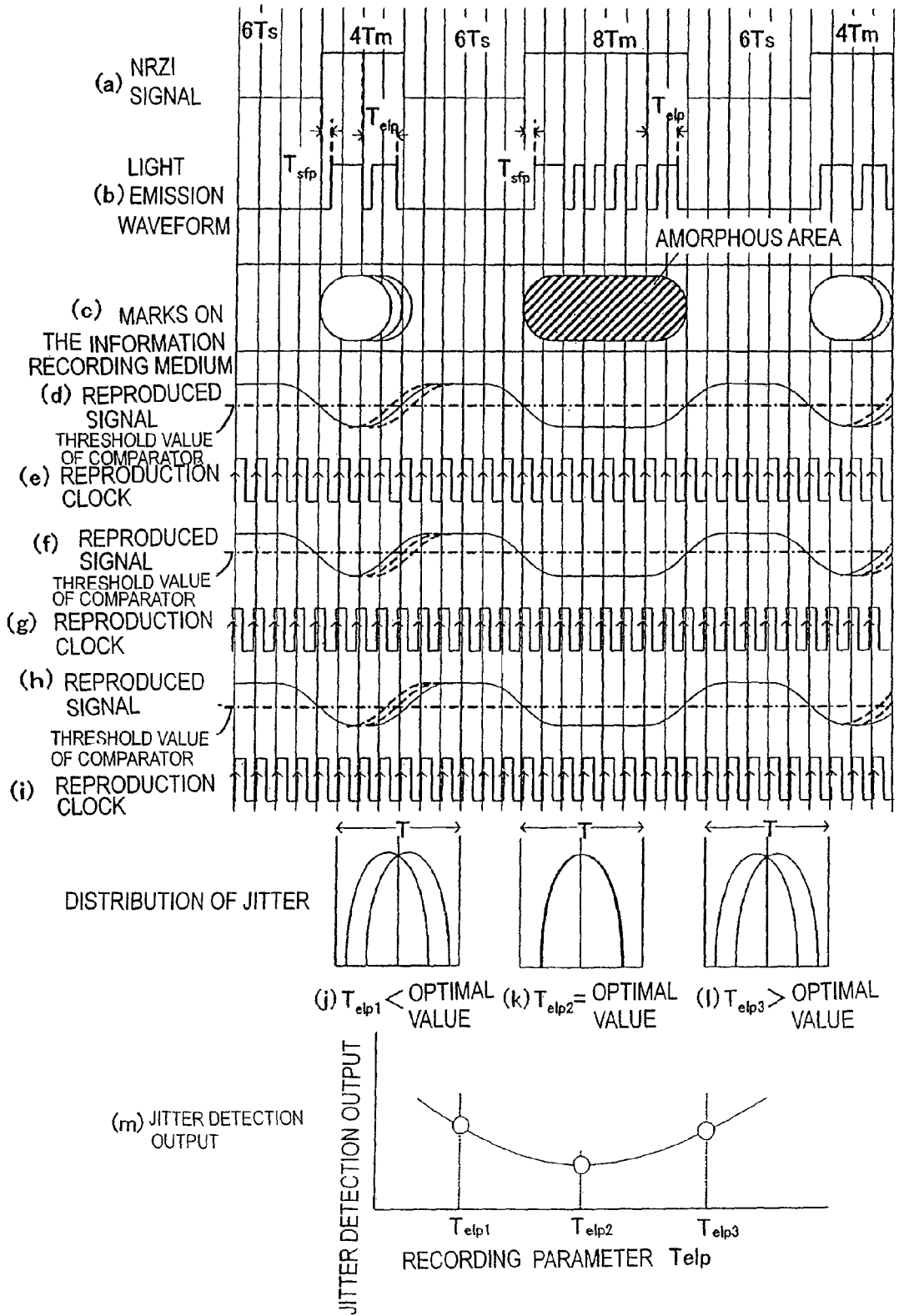

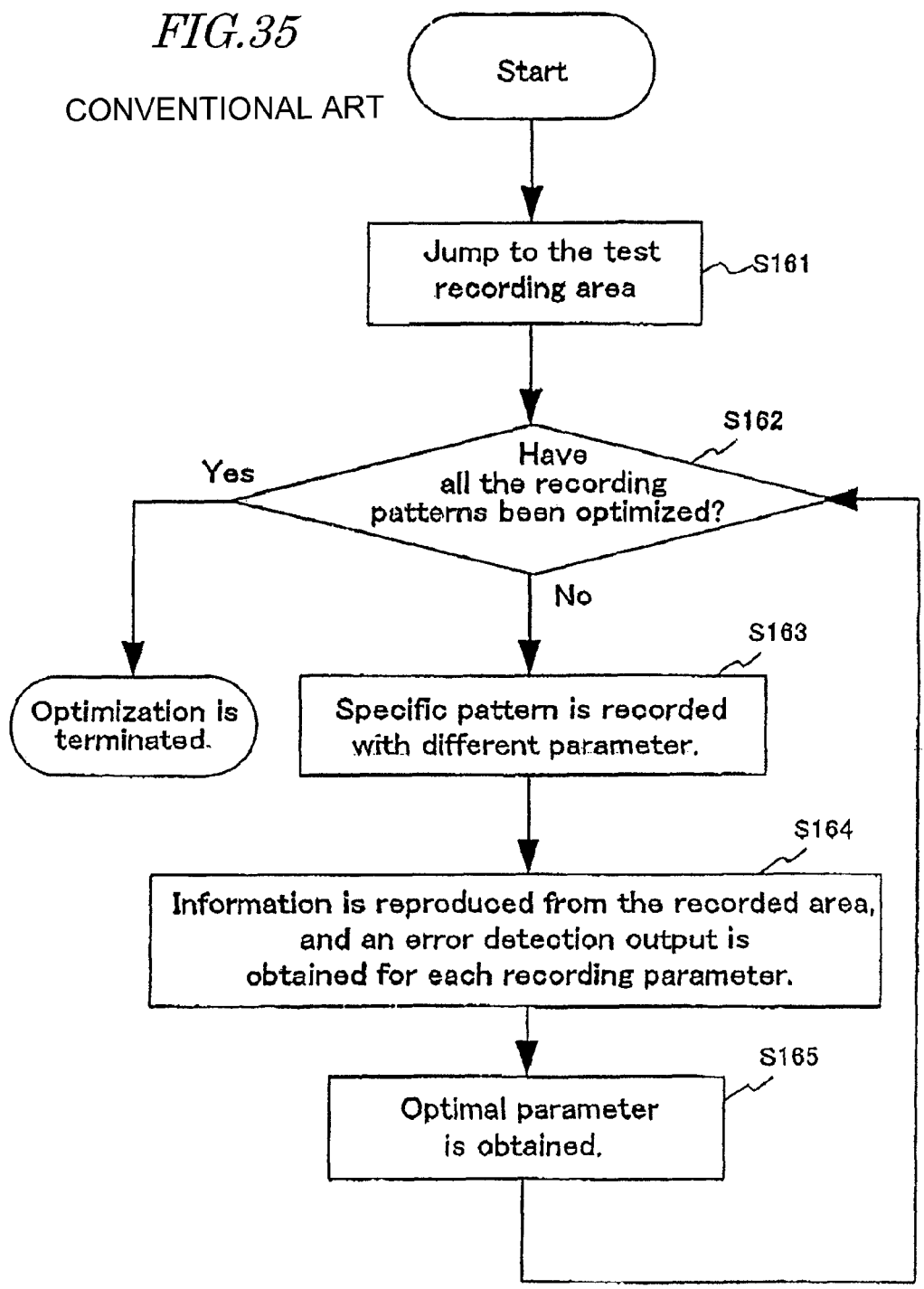

US 8,000,197 B2

RECORDING/REPRODUCING DEVICE, RECORDING CONDITION ADJUSTING DEVICE AND RECORDING/REPRODUCING METHOD

TECHNICAL FIELD

The present invention relates to a recording/reproduction apparatus, a recording condition adjusting device, and a recording/reproduction method using a maximum likelihood decoding method.

BACKGROUND ART

In recording/reproduction apparatuses for recording original digital information on, or reproducing such information from, a portable recording medium, there can be a variance in the shape of marks formed on the medium among individual apparatuses or recording mediums even with an identical shape of recording pulse. This results in significant difference in the quality of the signal reproduced. In order to avoid reduction in the reliability due to the variance, a correction operation is performed when, for example, the recording medium is mounted. A correction operation is a control operation for optimizing the setting of characteristics of the reproduction system, the shape of the recording pulse, or the like, in order to guarantee the reliability of user data.

A general information reproduction apparatus includes a PLL circuit for extracting clock information included in a reproduced signal and identifying the original digital information based on the clock information extracted.

FIG. 33 shows a conventional optical disc drive. Light reflected by an optical disc 17 is converted into a reproduced signal by an optical head 18. The reproduced signal is shape-rectified by a waveform equalizer 19. The resultant reproduced signal is binarized by a comparator 20. Usually, the threshold of the comparator 20 is feedback-controlled such that an integration result of binary signal outputs is 0. A phase comparator 21 obtains phase errors between the binary signal outputs and the reproduction clocks. The phase errors are averaged by an LPF 22, and a control voltage of a VCO 23 is determined based on the processing result. The phase comparator 21 is feedback-controlled such that the phase errors output by the phase comparator 21 are always 0. In recording mediums on which information is thermally recorded, the shape of the marks formed thereon vary in accordance with the thermal interference of the mediums and recording patterns before and after the mark which is to be recorded. Therefore, a recording parameter which is optimum for the recording of each pattern needs to be set.

The above-described error detection output is an index for evaluating the recording parameter. The recording parameter is set such that the error detection output is as small as possible. Specifically, a recording compensation circuit 27 generates a pulse having a prescribed pattern based on a recording pattern which is output from a pattern generation circuit 26 using an initially set recording parameter. A laser driving circuit 28 records information on the optical disc. While information is being reproduced from a track having the prescribed pattern recorded thereon, an error detection circuit 24 integrates absolute values of phase errors between an output from the comparator 20 and an output from the VCO 23, and thus obtains a detection signal. The detection signal is correlated with jitter between a reproduction clock and a binarized pulse edge. Recording and reproduction are repeatedly performed with different recording parameters. The recording parameter used when the detection value is minimum is determined as an optimum recording parameter.

FIG. 34 shows a specific operation of the error detection circuit 24. Here, a recording pattern having a repetition of 6T, 4T, 6T and 8T is used. The mark termination edge corresponding to a pattern of a combination of 4T marks and 6T spaces is optimized. It is assumed that a mark start edge corresponding to a pattern of a combination of 6T spaces and 8T marks, and a mark termination edge corresponding to a pattern of a combination of 8T marks and 6T spaces, are recorded with an optimum recording parameter.

When given an NRZI signal having a period shown in FIG. 34(a), the recording compensation circuit 27 generates a laser driving waveform pulse shown in FIG. 34(b). Tsfp is a parameter for setting a mark start position, and Telp is a parameter for setting a mark termination position. The laser driving circuit 28 modulates light emitting power in accordance with the pattern shown in FIG. 34(b). An amorphous area is physically formed on the track as shown in FIG. 34(c) by laser light. When Telp is varied as Telp1, Telp2 and Telp3, the shape of the mark formed is changed as shown in FIG. 34(c). Information reproduction from the track having such marks will be discussed.

When the recording parameter at the end of the 4T mark is Telp2, which is the optimum value, a reproduced signal shown with a solid line in FIG. 34(d) is obtained. The threshold value is defined such that the integration value of the outputs from the comparator is 0. A phase difference between the output from the comparator and the reproduction clock is detected, and a reproduction clock (FIG. 34(e)) is generated such that the integration value of the phase errors is 0.

In the case where the recording parameter at the end of a 4T mark is made Telp1, which is smaller than the optimum value, a reproduced signal shown in FIG. 34(f) with the solid line is obtained. Since the termination edge of the 4T mark changes in a time axis direction, the threshold value Tv of the comparator is greater than in the reproduced signal shown in FIG. 34(d), as indicated by the one-dot chain line in FIG. 34(f). Because of the change in the output from the comparator, the phase of the reproduction clock is advanced as compared to the reproduction clock shown in FIG. 34(e) such that the integration value of the phase errors is 0. As a result, a reproduction clock shown in FIG. 34(g) is generated.

By contrast, in the case where the recording parameter at the end of a 4T mark is made Telp3, which is greater than the optimum value, a reproduced signal shown in FIG. 34(h) with the solid line is obtained. Since the termination edge of the 4T mark changes in a time axis direction, the threshold value Tv of the comparator is smaller than in the reproduced signal shown in FIG. 34(d), as indicated by the one-dot chain line in FIG. 34(h). Because of the change in the output from the comparator, the phase of the reproduction clock is behind as compared to the reproduction clock shown in FIG. 34(e) such that the integration value of the phase errors is 0. As a result, a reproduction clock shown in FIG. 34(i) is generated.

Measurement results of the time difference between the mark termination edge (rising edge of a reproduced signal) and the reproduction clock (so-called data-clock jitter) exhibit distributions shown in FIG. 34(j) through (l). It is assumed here that the 4T mark termination edge and the 8T mark termination edge have a variance such that both of the edges exhibit normal distributions of identical variance values.

In the case of the reproduced signal shown in FIG. 34(d), and the reproduction clock shown in FIG. 34(e), the time difference distribution between the output from the comparator and the reproduction clock at the rising edge (mark termination edge) is as shown in FIG. 34(k). The average value of the distributed values at the 4T mark termination edge, and the average value of the distributed values at the 8T mark termination edge, are each 0.

In the case where the parameter of the end of the 4T mark is Telp1 (smaller than the optimum value Telp2), neither the average value of the distributed values at the 4T mark termination edge, nor the average value of the distributed values at the 8T mark termination edge, is 0, but both are away from 0 by the same distance, as shown in FIG. 34(j). Therefore, the total variance at the rising edge is greater than the case in FIG. 34(k). Similarly, in the case where the parameter of the end of the 4T mark is Telp3 (greater than the optimum value Telp2), neither the average value of the distributed values at the 4T mark termination edge, nor the average value of the distributed values at the 8T mark termination edge, is 0, but both are away from 0 by the same distance, as shown in FIG. 34(l). In FIG. 34(j) and (l), the distribution of the 4T mark termination edge and the distribution of the 8T mark termination edge are inverted. In this case also, the total variance at the rising edge is greater than the case in FIG. 34(k).

In the case where the accumulation result of absolute values of phase errors is the error detection output, the error detection value changes as shown in FIG. 34(m) in accordance with the change in the recording parameter Telp. Accordingly, the recording parameter is varied, and the parameter when the output from the error detection circuit 24 is minimum is determined as an optimum parameter.

In the above example, the parameter Telp at the 4T mark termination edge is optimized. For the other parameters, test recordings using a respective specific parameter are performed and the optimum parameters are obtained based on the error detection output.

FIG. 35 is a flowchart illustrating an operation for obtaining all the recording parameters in accordance with the above-described procedure. Areas of a medium on which test recordings are to be performed are accessed (S161), and the test recordings are performed while the recording parameter at the mark start edge or the mark termination edge is changed prescribed area by prescribed area (for example, sector by sector)(S163). Information is reproduced from the test recording areas, and error detection outputs are obtained area by area by which the parameter is changed (S164). The parameter at which the error detection output is minimum is determined as an optimum parameter (S165). This operation is repeated until all the optimum parameters are obtained (S162) in order to obtain the next parameter (see Patent Document No. 1 and Patent Document No. 2).

Patent Document No. 1: Japanese Laid-Open Patent Publication No. 2000-200418

Patent Document No. 2: Japanese Laid-Open Patent Publication No. 2001-109597

DISCLOSURE OF INVENTION

Problems to be Solved by the Invention

The above-described method by which the recording parameter is set such that the jitter is minimum has the following problem. In a system adopting a maximum likelihood decoding method, the probability of error occurrence is not necessarily minimum. Typically by the maximum likelihood decoding method, a signal pattern is estimated from a reproduced signal waveform, and the reproduced signal waveform and the estimated signal waveform are compared with each other, so that the reproduced signal is decoded into a signal having a signal pattern which has the maximum likelihood. By the maximum likelihood decoding method, the probability of error occurrence is lower as the difference between the reproduced signal waveform and the estimated signal waveform is smaller.

The present invention has an object of providing a recording condition adjusting device, a recording/reproduction apparatus, and a recording control method for optimizing a recording parameter for recording information, such that the probability of error occurrence at the time of maximum-likelihood decoding is minimum.

Means for Solving the Problems

A recording condition adjusting device according to the present invention includes a shaping section for receiving a first digital signal generated from an analog signal representing first information reproduced from an information recording medium and shaping a waveform of the first digital signal to generate a second digital signal; a maximum likelihood decoding section for performing maximum likelihood decoding on the second digital signal to generate a binary signal having maximum likelihood; a calculation section for calculating a first index representing likelihood of a first state transition sequence determined as having maximum likelihood by the maximum likelihood decoding section and a second index representing likelihood of a second state transition sequence determined as having second maximum likelihood by the maximum likelihood decoding section, and calculating a third index obtained based on a difference between the first index and the second index; and an adjusting section for adjusting a power of a recording signal for recording second information on the information recording medium based on a degree of deviation of the third index.

In one embodiment, the adjusting section adjusts the power of the recording signal so as to decrease the degree of deviation.

In one embodiment, the adjusting section adjusts the power of the recording signal so as to make the degree of deviation equal to or smaller than a predetermined value.

In one embodiment, the adjusting section adjusts an edge position of the recording signal based on an average value of the third index.

In one embodiment, adjusting section adjusts the edge position of the recording signal so as to decrease an absolute value of the average value.

In one embodiment, the adjusting section adjusts the edge position of the recording signal so as to make the absolute value of the average value equal to or smaller than a predetermined value.

In one embodiment, the adjusting section adjusts an edge position of the recording signal based on an average value of the third index; where the degree of deviation is equal to or smaller than a predetermined value and an absolute value of the average value is larger than a predetermined value, the adjusting section adjusts the edge position with priority over the power of the recording signal so as to make the absolute value of the average value equal to or smaller than a predetermined value; and where the absolute value of the average value is equal to or smaller than the predetermined value and the degree of deviation is larger than the predetermined value, the adjusting section adjusts the power with priority over the edge position of the recording signal so as to make the degree of deviation equal to or smaller than the predetermined value.

A recording condition adjusting method according to the present invention includes the steps of receiving a first digital signal generated from an analog signal representing first information reproduced from an information recording medium and shaping a waveform of the first digital signal to generate a second digital signal; performing maximum likelihood decoding on the second digital signal to generate a binary signal having maximum likelihood; calculating a first index representing likelihood of a first state transition sequence determined as having maximum likelihood by a maximum likelihood decoding section and a second index representing likelihood of a second state transition sequence determined as having second maximum likelihood by the maximum likelihood decoding section, and calculating a third index obtained based on a difference between the first index and the second index; and adjusting a power of a recording signal for recording second information on the information recording medium based on a degree of deviation of the third index.

A program, according to the present invention, is for executing recording condition adjusting processing. The recording condition adjusting processing includes the steps of receiving a first digital signal generated from an analog signal representing first information reproduced from an information recording medium and shaping a waveform of the first digital signal to generate a second digital signal; performing maximum likelihood decoding on the second digital signal to generate a binary signal having maximum likelihood; calculating a first index representing likelihood of a first state transition sequence determined as having maximum likelihood by a maximum likelihood decoding section and a second index representing likelihood of a second state transition sequence determined as having second maximum likelihood by the maximum likelihood decoding section, and calculating a third index obtained based on a difference between the first index and the second index; and adjusting a power of a recording signal for recording second information on the information recording medium based on a degree of deviation of the third index.

An information recording apparatus according to the present invention includes a reproduction section for generating a first digital signal from an analog signal representing first information reproduced from an information recording medium; and a recording condition adjusting device. The recording condition adjusting device includes a shaping section for receiving the first digital signal and shaping a waveform of the first digital signal to generate a second digital signal; a maximum likelihood decoding section for performing maximum likelihood decoding on the second digital signal to generate a binary signal having maximum likelihood; a calculation section for calculating a first index representing likelihood of a first state transition sequence determined as having maximum likelihood by the maximum likelihood decoding section and a second index representing likelihood of a second state transition sequence determined as having second maximum likelihood by the maximum likelihood decoding section, and calculating a third index obtained based on a difference between the first index and the second index; and an adjusting section for adjusting a power of a recording signal for recording second information on the information recording medium based on a degree of deviation of the third index. The information recording apparatus further includes a recording section for recording the second information on the information recording medium based on a result of the adjustment of the power of the recording signal.

An information recording medium according to the present invention is usable for a recording condition adjusting method of receiving a first digital signal generated from an analog signal representing first information reproduced from an information recording medium and shaping a waveform of the first digital signal to generate a second digital signal; performing maximum likelihood decoding on the second digital signal to generate a binary signal having maximum likelihood; calculating a first index representing likelihood of a first state transition sequence determined as having maximum likelihood and a second index representing likelihood of a second state transition sequence determined as having second maximum likelihood, and calculating a third index obtained based on a difference between the first index and the second index; and adjusting a power of a recording signal for recording second information on the information recording medium based on a degree of deviation of the third index. The information recording medium has an area for recording a recording condition with which the degree of deviation is smaller than a predetermined value.

An information recording medium according to the present invention is usable for a recording condition adjusting method of receiving a first digital signal generated from an analog signal representing first information reproduced from an information recording medium and shaping a waveform of the first digital signal to generate a second digital signal; performing maximum likelihood decoding on the second digital signal to generate a binary signal having maximum likelihood; calculating a first index representing likelihood of a first state transition sequence determined as having maximum likelihood and a second index representing likelihood of a second state transition sequence determined as having second maximum likelihood, and calculating a third index obtained based on a difference between the first index and the second index; and adjusting an edge position of a recording signal for recording second information on the information recording medium based on an average value of the third index. The information recording medium has an area for recording a recording condition with which the average value is smaller than a predetermined value.

An information recording medium is usable for a recording condition adjusting method of receiving a first digital signal generated from an analog signal representing first information reproduced from an information recording medium and shaping a waveform of the first digital signal to generate a second digital signal; performing maximum likelihood decoding on the second digital signal to generate a binary signal having maximum likelihood; calculating a first index representing likelihood of a first state transition sequence determined as having maximum likelihood and a second index representing likelihood of a second state transition sequence determined as having second maximum likelihood, and calculating a third index obtained based on a difference between the first index and the second index; adjusting a power of a recording signal for recording second information on the information recording medium based on a degree of deviation of the third index; and adjusting an edge position of the recording signal for recording the second information on the information recording medium based on an average value of the third index. The information recording medium has an area for recording at least one of a recording condition with which the degree of deviation is smaller than a predetermined value, a recording condition with which the average value is smaller than a predetermined value, and a recording condition with which a square root of a sum of a square of the degree of deviation and a square of the average value is smaller than a predetermined value.

A recording condition adjusting method according to the present invention is of acquiring reproduced information obtained by reproducing information recorded with a predetermined recording condition and evaluating the reproduced information to adjust the recording condition. The recording condition adjusting method includes a power adjusting step of adjusting a recording power based on a first element obtained from an index used for the evaluation; and a position adjusting step of adjusting a recording position based on a second element obtained from the index used for the evaluation before or after the power adjusting step.

In one embodiment, the index used for the evaluation is a statistical index; the first element is information on the degree of deviation of the index; and the second element is information on the average value of the index.

In one embodiment, where the first element fulfills a first condition and the second element does not fulfill the second condition, the recording position is adjusted; and where the first element does not fulfill the first condition and the second element fulfills the second condition, the recording power is adjusted.

EFFECTS OF THE INVENTION

According to the present invention, a first index representing the likelihood of a first state transition sequence determined as having maximum likelihood by maximum likelihood decoding and a second index representing the likelihood of a second state transition sequence determined as having second maximum likelihood are calculated. A third index obtained based on a difference between the first index and the second index is also calculated. Based on the degree of deviation of the third index, a power of a recording signal for recording information on an information recording medium is adjusted. Since this can adjust the power and shape of the recording signal such that the reliability level of the maximum likelihood decoding result is increased, the probability of error occurrence at the time of maximum likelihood decoding can be decreased.

BRIEF DESCRIPTION OF THE DRAWINGS

FIG. 3 shows distributions of Pa−Pb and |Pa−Pb|−Pstd.

FIG. 10 shows distributions of Pa−Pb and |Pa−Pb|−Pstd.
FIG. 11 shows distributions of Pa−Pb and |Pa−Pb|−Pstd.
FIG. 12 shows distributions of Pa−Pb and |Pa−Pb|−Pstd.

FIG. 16 is a diagram showing an example of a recording pattern for learning.

FIG. 20 shows the correlation between a reproduced waveform and the shift of a recording mark in Pattern-1.

FIG. 21 shows a list of recording parameters requiring optimization.

FIG. 22 shows which of the specific 8 patterns is used to detect each of the recording parameters requiring optimization.

FIG. 23 shows a sensitivity of M_SN and M_SHIFT.

FIG. 34 is a diagram showing an operation of a conventional error detection circuit.

FIG. 35 is a flowchart showing a conventional operation for obtaining a recording parameter.

DESCRIPTION OF THE REFERENCE NUMERALS

Figure 1:
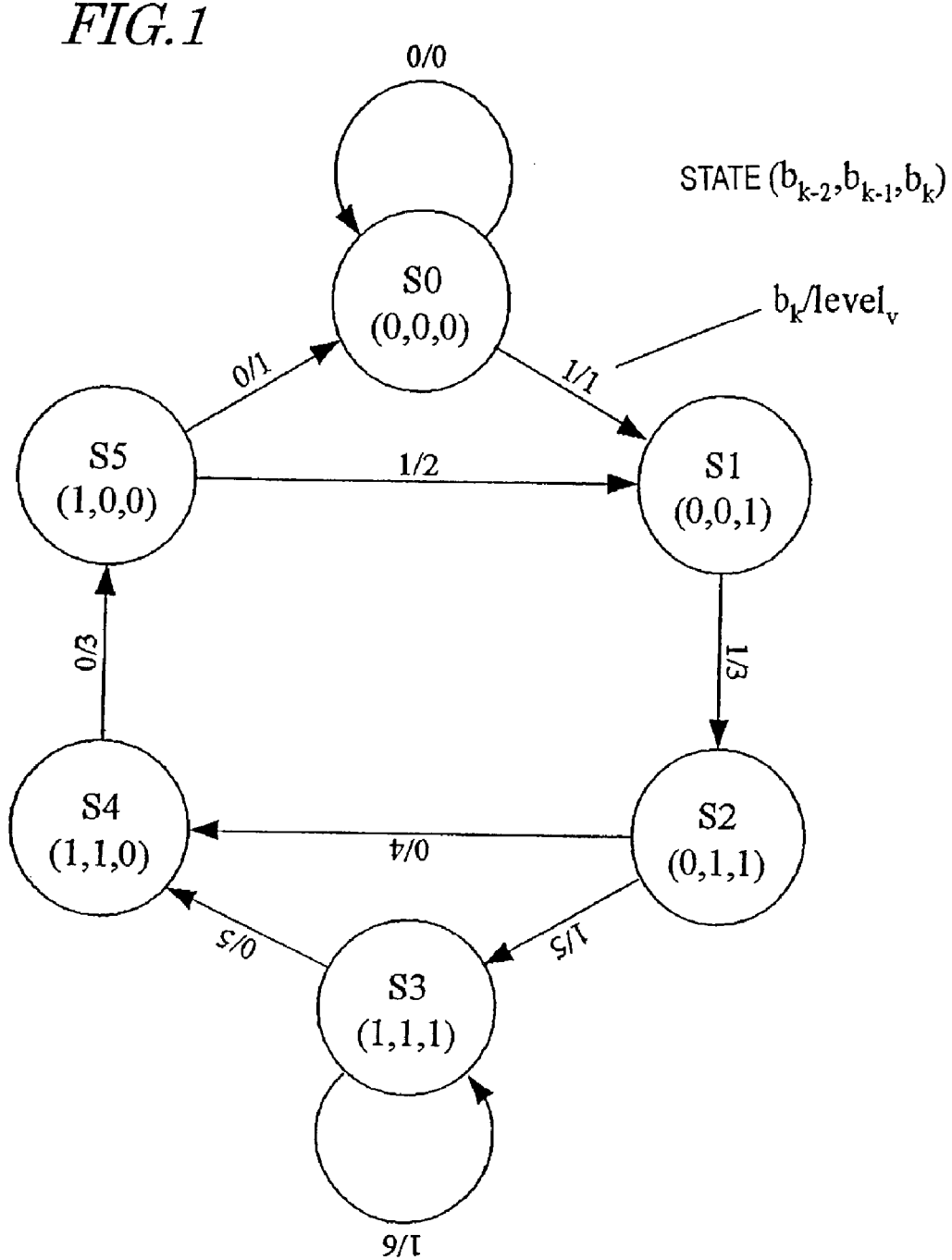
FIG. 1 is a state transition diagram representing a state transition rule which is defined based on a recording code having a minimum polarity inversion interval of 2 and an equalization system PR (1, 2, 2, 1).

1 Information recording medium
2 Optical head
3 Preamplifier
4 AGC
5 Waveform equalizer
6 A/D converter
7 PLL circuit
8 Shaping section
9 Maximum likelihood decoding section
10 Reliability calculation section
11 Pattern detection circuit
12 Edge shift detection circuit
13 Information recording medium controller
14 Pattern generation circuit
15 Recording compensation circuit
16 Laser driving section
100 Recording/reproduction apparatus
101 Reproduction section 102 Recording condition adjusting device
103 Recording section
104 Adjusting section

BEST MODE FOR CARRYING OUT THE INVENTION

Hereinafter, the present invention will be described by way of embodiments with reference to the attached drawings.

The present invention optimizes a recording parameter in a system adopting a maximum likelihood decoding method, such that the probability at which a reproduced signal error occurs is minimum. In general, a reproduced signal can have a waveform which is disturbed as compared to an ideal waveform representing information correctly, due to the influences of information recording conditions or reproduction conditions. According to the maximum likelihood decoding method, an ideal waveform pattern is estimated from the reproduced signal waveform, and the reproduced signal waveform and the estimated signal waveform are compared with each other, so that the reproduced signal is decoded into a signal having a waveform pattern which has the maximum likelihood. By the maximum likelihood decoding method, the probability of error occurrence is lower as the difference between the reproduced signal waveform and the estimated signal waveform is smaller. The present invention adjusts a recording parameter such that the difference between the reproduced signal waveform and the estimated signal waveform is minimized.

(1. Regarding Index M_SN, Index M_SHIFT, Index M)

Reproduced signal evaluation indices (index M_SN, index M_SHIFT, index M) usable for evaluating a reproduced signal with the maximum likelihood decoding method will be described. For example, a reproduced signal evaluation index will be described in the case where a recording code (e.g., (1, 7) Run Length Limited code) having a minimum polarity inversion interval of 2 is used to shape a signal waveform such that the frequency characteristics of a signal during a recording/reproduction operation are PR (1, 2, 2, 1) equalization characteristics.

In a sequence of digital signals (binary signal "1" or "0") reproduced from a recorded track after test recording, $b_k$ is the recording code at the current time, $b_{k-1}$ is the recording code at the time which is one time unit before the current time, $b_{k-2}$ is the recording code at the time which is two time units before the current time, and $b_{k-3}$ is the recording code at the time which is three time units before the current time. An ideal output value $Level_v$ of PR (1, 2, 2, 1) equalization is represented by expression 1.

$$Level_v = b_{k-3} + 2b_{k-2} + 2b_{k-1} + b_k \quad \text{Expression 1}$$

Here, k is an integer indicating time, and v is an integer of 0 to 6.

Table 1 is a state transition table, where a state at time k is represented by $S(b_{k-2}, b_{k-1}, b_k)$.

[Table 1]

TABLE 1

| State transition table defined by the minimum polarity inversion interval of 2 and PR (1, 2, 2, 1) | | |
|---|---|---|
| State at time k − 1 $S(b_{k-3}, b_{k-2}, b_{k-1})$ | State at time k $S(b_{k-2}, b_{k-1}, b_k)$ | $b_k$/Level$_v$ |
| S(0, 0, 0) | S(0, 0, 0) | 0/0 |
| S(0, 0, 0) | S(0, 0, 1) | 1/1 |
| S(0, 0, 1) | S(0, 1, 1) | 1/3 |

TABLE 1-continued

| State transition table defined by the minimum polarity inversion interval of 2 and PR (1, 2, 2, 1) | | |
|---|---|---|
| State at time k − 1 $S(b_{k-3}, b_{k-2}, b_{k-1})$ | State at time k $S(b_{k-2}, b_{k-1}, b_k)$ | $b_k$/Level$_v$ |
| S(0, 1, 1) | S(1, 1, 0) | 0/4 |
| S(0, 1, 1) | S(1, 1, 1) | 1/5 |
| S(1, 0, 0) | S(0, 0, 0) | 0/1 |
| S(1, 0, 0) | S(0, 0, 1) | 1/2 |
| S(1, 1, 0) | S(1, 0, 0) | 0/3 |
| S(1, 1, 1) | S(1, 1, 0) | 0/5 |
| S(1, 1, 1) | S(1, 1, 1) | 1/6 |

FIG. 1 shows a state transition diagram where, for the sake of simplicity, at time k, a state $S(0, 0, 0)_k$ is represented by $S0_k$, a state $S(0, 0, 1)_k$ is represented by $S1_k$, a state $S(0, 1, 1)_k$ is represented by $S2_k$, a state $S(1, 1, 1)_k$ is represented by $S3_k$, a state $S(1, 1, 0)_k$ is represented by $S4_k$, and a state $S(1, 0, 0)_k$ is represented by $S5_k$.

FIG. 1 shows a state transition diagram representing a state transition rule which is defined by a recording code having a minimum polarity inversion interval of 2 and an equalization system PR (1, 2, 2, 1).

Figure 2:
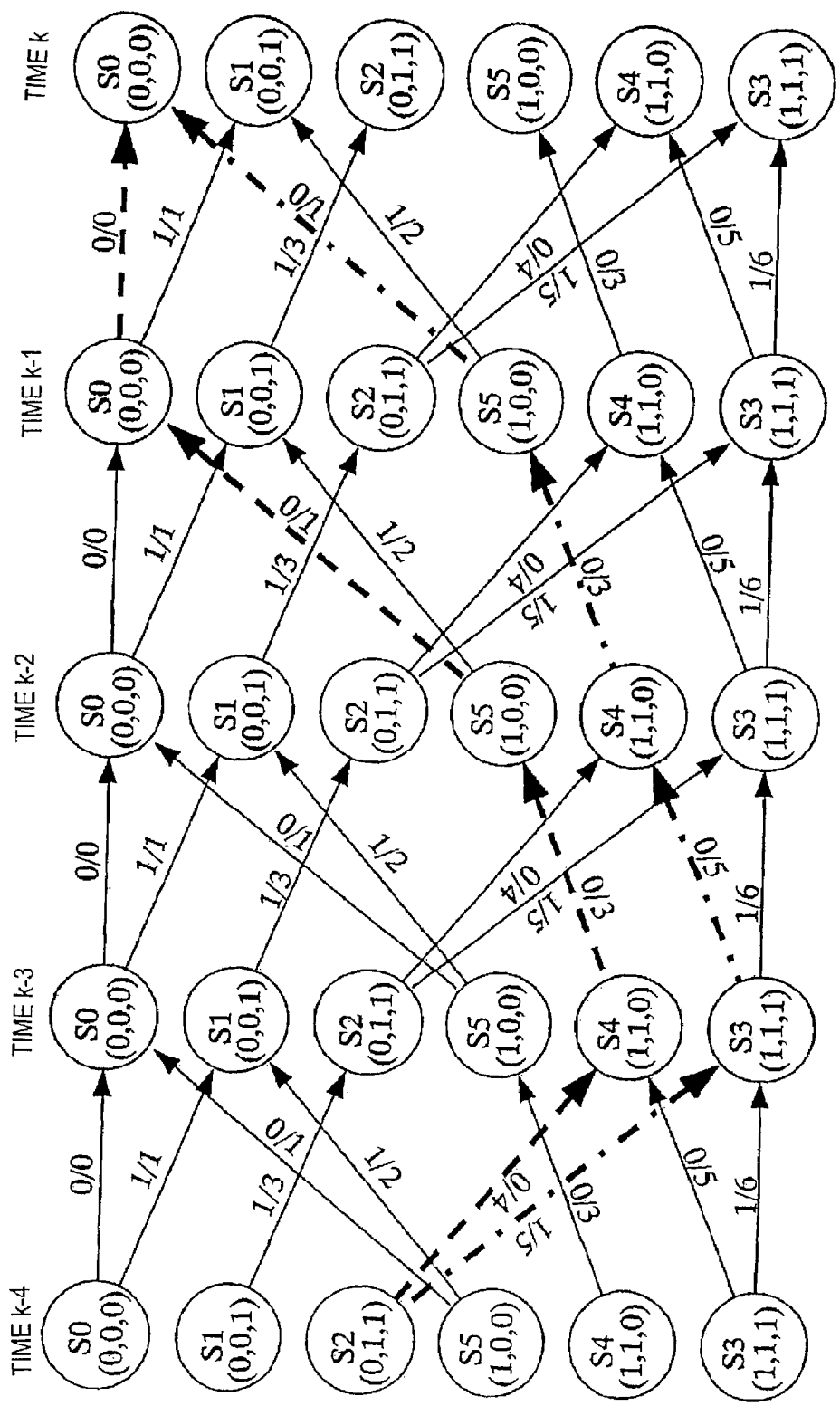
FIG. 2 is, a trellis diagram which is obtained by developing the state transition diagram along a time axis.

FIG. 2 shows a trellis diagram which is obtained by developing the state transition diagram in FIG. 1 along a time axis.

Hereinafter, state transition defined by the recording code having a minimum polarity inversion interval of 2 and the equalization system PR (1, 2, 2, 1) will be described with reference to FIGS. 1 and 2.

See the state $S0_k$ at time k and the state $S0_{k-4}$ at time k−4. FIG. 2 shows two possible state transition sequences between the state $S0_k$ and the state $S0_{k-4}$. Where one of the possible state transition sequences is referred to as a path A, the path A is a transition sequence of states $S2_{k-4}, S4_{k-3}, S5_{k-2}, S0_{k-1}$ and $S0_k$. Where the other state transition sequence is referred to as a path B, the path B is a transition sequence of states $S2_{k-4}, S3_{k-3}, S4_{k-2}, S5_{k-1}$ and $S0_k$.

The paths A and B correspond to candidates for an ideal waveform estimated from the reproduced signal waveform. According to the maximum likelihood decoding method, the estimated paths A and B are compared with the reproduced signal waveform, and the path determined as representing a more accurate waveform is selected. The reproduced signal is decoded so as to match the selected path.

Here, the result of maximum likelihood decoding from time k−6 to time k is represented by $(C_{k-6}, C_{k-5}, C_{k-4}, C_{k-3}, C_{k-2}, C_{k-1}, C_k)$. When the decoding result $(C_{k-6}, C_{k-5}, C_{k-4}, C_{k-3}, C_{k-2}, C_{k-1}, C_k) = (0, 1, 1, x, 0, 0, 0)$ (where x is 0 or 1) is obtained, this means that the state transition sequence of the path A or the path B is estimated to have the maximum likelihood. The path A and the path B have the same level of likelihood that a state at time k−4 is the state $S2_{k-4}$. Therefore, by calculating a sum of squares of differences between values of reproduced signals $y_{k-3}$ through $y_k$ and corresponding expected values on each of the path A and the path B from time k−3 to time k, it is determined whether the transition sequence of the path A or the path B has a higher level of likelihood.

Where the sum of squares of differences between the values of reproduced signals $y_{k-3}$ through $y_k$ and corresponding expected values on the path A from time k−3 to time k is Pa, Pa is represented by expression 2.

$$Pa = (y_{k-3}-4)^2 + (y_{k-2}-3)^2 + (y_{k-1}-1)^2 + (y_k-0)^2 \quad \text{Expression 2}$$

Where the sum of squares of differences between the values of reproduced signals $y_{k-3}$ through $y_k$ and corresponding expected values on the path B from time k−3 to time k is Pb, Pb is represented by expression 3.

$$Pb=(y_{k-3}-5)^2+(y_{k-2}-5)^2+(y_{k-1}-3)^2+(y_k-1)^2 \quad \text{Expression 3}$$

Pa represents the degree at which the path A and the reproduced signal are away from each other, and Pa=0 represents the state in which the path A and the reproduced signal match each other. As the value of Pa increases, the path A and the reproduced signal are further away from each other. Similarly, Pb represents the degree at which the path B and the reproduced signal are away from each other, and Pb=0 represents the state in which the path B and the reproduced signal match each other. As the value of Pb increases, the path B and the reproduced signal are further away from each other.

Hereinafter, the meaning of the difference between Pa and Pb (i.e., Pa−Pb) which indicates the reliability level of the result of maximum likelihood decoding. A maximum likelihood decoding section may be considered to have selected the path A with confidence when Pa<<Pb, and the path B when Pa>>Pb. When Pa=Pb, either the path A or the path B could have been selected. In this case, the chance that the decoding result is correct or incorrect may be fifty-fifty. In this manner, Pa−Pb is obtained from the results of decoding performed by a predetermined time duration or by a predetermined number of times. Then, a distribution of Pa−Pb is obtained.

FIG. 3 shows distributions of Pa−Pb and |Pa−Pb|−Pstd.

FIG. 3(a) shows a distribution of Pa−Pb when noise is superimposed on a reproduced signal. The distribution has two peaks. One of the peaks indicating the maximum incidence is exhibited when Pa=0, while the other peak indicating the maximum incidence is exhibited when Pb=0.

As the result of performing the decoding a plurality of times, when the reproduced signal is proximate to the path A, a parabolic distribution having the maximum incidence when Pa=0 is obtained. Similarly, when the reproduced signal is proximate to the path B, a parabolic distribution having the maximum incidence when Pb=0 is obtained.

Herein, the value of Pa−Pb when Pa=0 will be represented as −Pstd, while the value of Pa−Pb when Pb=0 will be represented as Pstd. The absolute value of Pa−Pb is calculated to obtain |Pa−Pb|−Pstd.

FIG. 3(b) shows a distribution of |Pa−Pb|−Pstd. The standard deviation σ, and the average value Pave of the distribution of FIG. 3(b) is calculated. It is assumed that the distribution of FIG. 3(b) is a normal distribution. It is also assumed, for example, that when the value of |Pa−Pb|, which shows the reliability level of the decoding result, is equal to or less than −Pstd based on the standard deviation σ and the average value Pave, such a value indicates that error is occurring. In such a case, the error probability P(σ, Pave) is represented by expression 4.

$$P(\sigma, Pave)=erfc((Pstd+Pave)/\sigma) \quad \text{Expression 4}$$

The error rate of a binary signal indicating the result of maximum likelihood decoding can be predicted based on the average value Pave and the standard deviation σ calculated from the distribution of Pa−Pb. In other words, the average value Pave and the standard deviation σ can be used as indices of the quality of a reproduced signal.

In the above example, the distribution of |Pa−Pb| is assumed to be a normal distribution. In the case where the distribution is not a normal distribution, the number of times that the value of |Pa−Pb|−Pstd is equal to or less than a predetermined reference value is counted. The obtained number of counts may be used as the index of the quality of the signal.

In the case of the state transition rule defined by the recording code having a minimum polarity inversion interval of 2 and the equalization system PR (1, 2, 2, 1), there are two possible state transition paths in the following number of state transition patterns: 8 patterns from time k−4 to time k; 8 patterns from time k−5 to time k; and 8 patterns from time k−6 to time k. In a wider range of detection, there are two possible state transition paths in the Pa−Pb number of patterns, where Pa−Pb shows the reliability level.

Among many patterns, there are a number of patterns which are insensitive to a change in a recording parameter (e.g., a write power, an erase power, etc.). Such a pattern is, for example, a path relating to a change in a space or a mark portion of a long mark. By excluding such a pattern and selecting only a pattern responding sensitively to a recording parameter, a change in a reproduced waveform occurring in accordance with a change in the recording parameter (recording power) can be detected with high precision. Patterns highly sensitive to a recording parameter are shown in Table 2.

[Table 2]

TABLE 2

State transition patterns in which there are two possible shortest state transition paths

| State transition | Reliability of decoding result Pa − Pb | |
| --- | --- | --- |
| | When Pa = 0 | When Pb = 0 |
| $S2_{k-4} \rightarrow S0_k$ | −10 | +10 |
| $S3_{k-4} \rightarrow S0_k$ | −10 | +10 |
| $S2_{k-4} \rightarrow S1_k$ | −10 | +10 |
| $S3_{k-4} \rightarrow S1_k$ | −10 | +10 |
| $S0_{k-4} \rightarrow S4_k$ | −10 | +10 |
| $S5_{k-4} \rightarrow S4_k$ | −10 | +10 |
| $S0_{k-4} \rightarrow S3_k$ | −10 | +10 |
| $S5_{k-4} \rightarrow S3_k$ | −10 | +10 |

Specifically, the group of patterns in Table 2 is related to a transition waveform from a mark to a space or from a space to a mark. For example, the patterns are assemblies of portions which respond sensitively to a change in the power of a recording leading pulse (write power), the power of a cooling pulse (bottom power), or a write power/erase power ratio.

Importantly, it is preferable to use the reliability level Pa−Pb as an index of the quality of the reproduced signal. This makes it unnecessary to detect all the patterns and makes it sufficient to detect only a pattern(s) having a high possibility of error (error rate). Such a detection result can be used as an index which is correlated with the error rate. A pattern having a high possibility of error is a pattern having a small value of reliability level Pa−Pb, i.e., 8 patterns where Pa−Pb=+10. These 8 patterns and Pa−Pb can be summarized in Table 2 above.

Next, X=|Pa−Pb|−Pstd is calculated. Based on the distribution thereof, a standard deviation σ(X) and an average value E(X) are calculated (E=Pave). Assuming that the distribution is a normal distribution as described with reference to FIG. 3(b), the probability P at which an error occurs is represented by expression 5.

$$P(\sigma(X), E(X))=erfc((Pstd+E(X))/\sigma(X)) \quad \text{Expression 5}$$

The above-mentioned 8 patterns cause a 1-bit shift error. The other patterns cause a 2- or more bit shift error. A result of analysis of error patterns after PRML (Partial Response Maximum Likelihood) processing shows that most of the errors are 1-bit shift errors. Therefore, the error rate of a reproduced signal can be estimated by expression 5. In this manner, the standard deviation σ(X) and the average value E(X) can be used as indices of the quality of a reproduced signal.

The present inventors found that when the quality of signals recorded on optical discs are inspected, the present inventors found that the standard deviation σ(X) heavily depends on the variance in the S/N ratio of a reproduced signal or a recording mark, and that the average value E(X) heavily depends on an edge shift of a reproduced signal, i.e., an average shift of a recording mark from an ideal position. Based on this, recording suitable to PRML can be performed by optimizing a recording condition such that the standard deviation σ(X) and the average value E(X) are minimized. An index representing the S/N ratio of a reproduced signal may be defined by, for example, expression 6.

$$M\_SN = \sigma(X)/(2 \cdot d_{min}^2)[\%] \qquad \text{Expression 6}$$

In the above expression, $d_{min}^2$ is the square of the minimum value of the Euclidean distance, and is 10 when a modulation code having a minimum polarity inversion interval of 2 is combined with the PR (1, 2, 2, 1) ML system. Namely, $d_{min}^2 = 10 = Pstd$.

An index representing the degree of an edge shift of a reproduced signal may be defined by, for example, expression 7.

$$M\_SHIFT = E(X)/(2 \cdot d_{min}^2)[\%] \qquad \text{Expression 7}$$

A total index M representing both of the S/N ratio and the degree of an edge shift of a reproduced signal may be defined by, for example, expression 8.

Expression 8

$$M = [\{\sigma(X)\}^2 + \{E(X)\}^2]^{1/2} / (2 \cdot d_{min}^2) [\%]$$
$$= [\{M\_SN\}^2 + \{M\_SHIFT\}^2]^{1/2} [\%]$$

M may be represented by expression 9 without using the standard deviation σ(X).

$$M = [E(X^2)]^{1/2}/(2 \cdot d_{min}^2)[\%] \qquad \text{Expression 9}$$

The indices are not limited to being represented by expressions 6, 7 and 8 as long as the indices are represented using the standard deviation σ(X) and the average value E(X).

Figure 13:
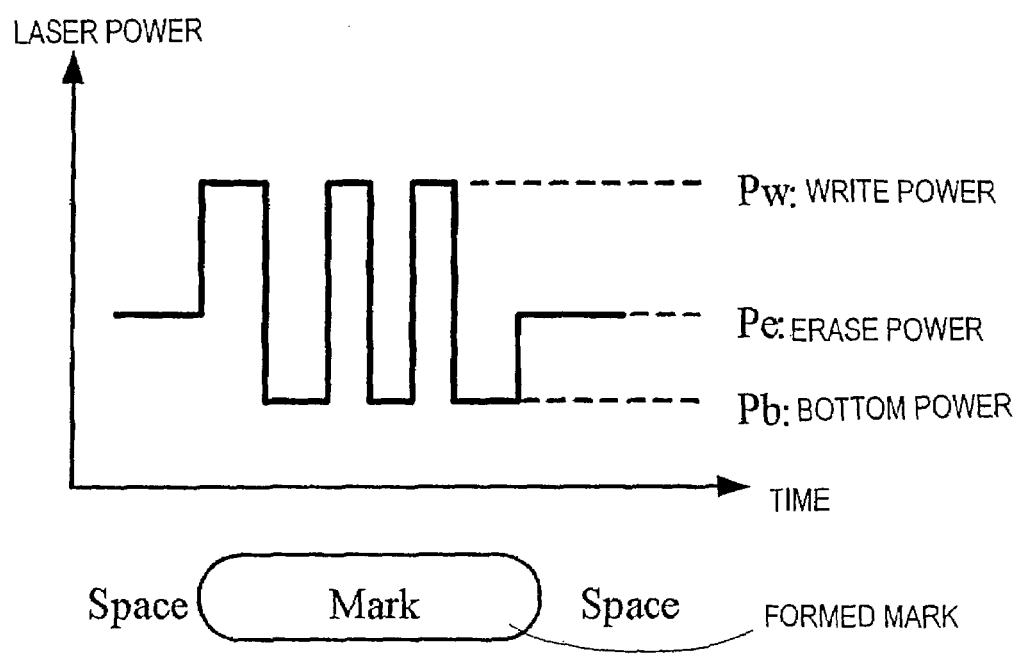
FIG. 13 shows a multi pulse having a write power Pw, an erase power Pe and a bottom power Pb.

By using the index M_SN to find a recording condition for obtaining, for example, M_SN which is equal to or less than a predetermined value while performing test recording, recording with a guaranteed S/N ratio can be performed. One highly conceivable recording condition for guaranteeing the S/N ratio is to increase the radiation power of laser light. Referring to FIG. 13, an alternative recording condition may be to enlarge the width of the central pulse sequences of the pulse light emission waveform other than the pulses at both ends. Especially for an optical disc on which data can be recorded only once, the width of a recording mark in the radial direction is enlarged and thus the S/N ratio is generally increased by increasing the radiation power or enlarging the width of the pulses in the central area other than the pulses at both ends.

By using the index M_SHIFT to find a recording condition for obtaining, for example, M_SHIFT which is equal to or less than a predetermined value while performing test recording, recording with a small edge shift can be performed. Referring to FIG. 13, one highly conceivable recording condition for decreasing the edge shift is to change the positions of the pulses at both ends of the pulse light emission waveform.

By using the index M to find a recording condition for obtaining, for example, M which is equal to or less than a predetermined value while performing test recording, optimum recording can be performed. In the case where only M is used, it can be detected that the optimum recording is not performed, but it cannot be distinguished whether the S/N ratio is low or the edge position of the mark is shifted. However, by using the indices M_SN and M_SHIFT according to the present invention, the reason why the optimum recording is not performed can be specified. For example, when M_SN is large, the radiation power of laser light can be adjusted; whereas when M_SHIFT is large, the edge position can be adjusted. Thus, the optimum recording condition can be obtained in a shorter time and more efficiently than the case where various combinations of radiation power of laser light and the edge position are tried in a random order.

(2. Recording/Reproduction Apparatus)

Figure 4:
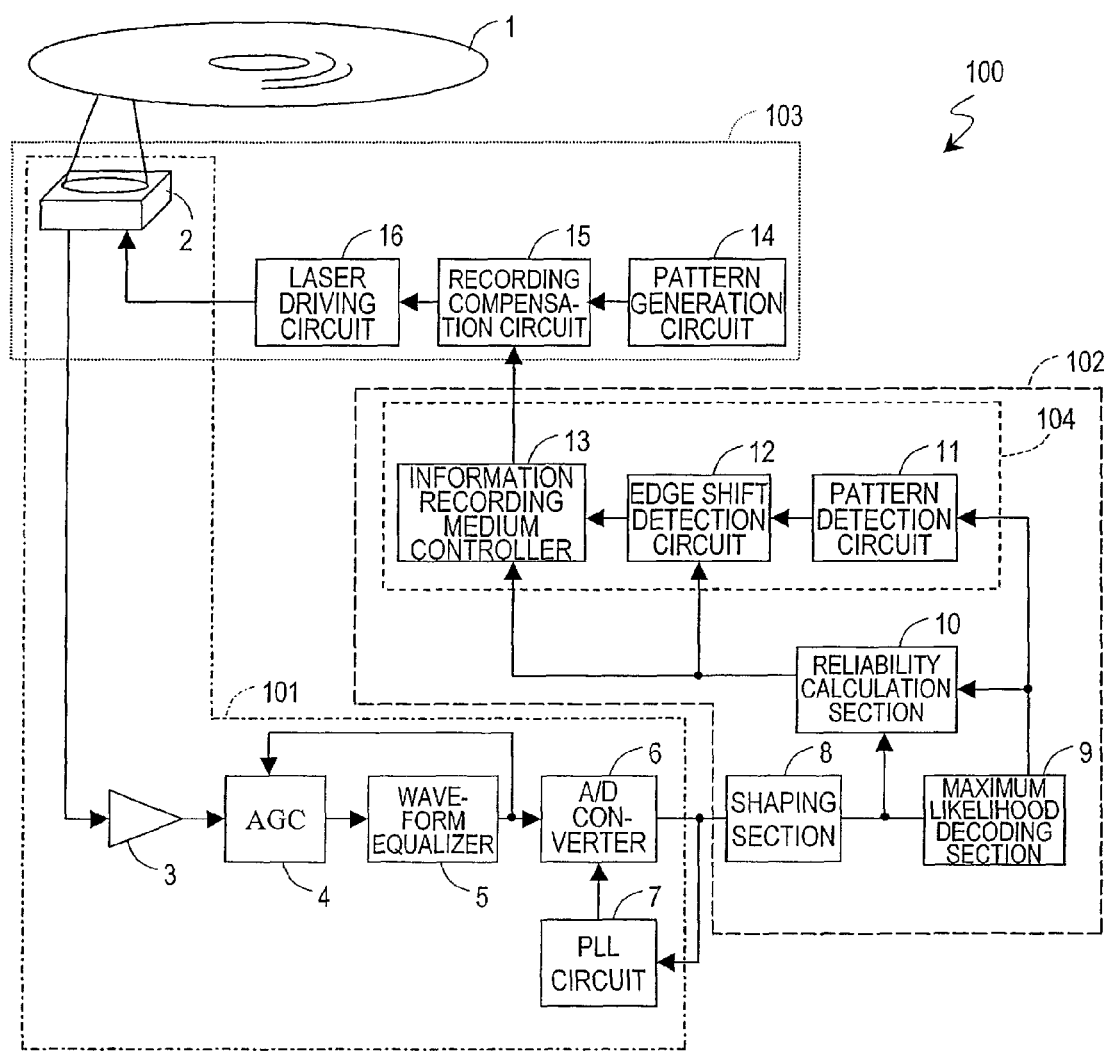
FIG. 4 shows a structure of a recording/reproduction apparatus 100 according to an example of the present invention.

FIG. 4 shows a recording/reproduction apparatus 100 according to an example of the present invention. The recording/reproduction apparatus 100 includes a reproduction section 101, a recording condition adjusting device 102, and a recording section 103. On the recording/reproduction apparatus 100, a recording medium 1 can be mounted. A recording medium 1 is used for optical information recording and reproduction, and is, for example, an optical disc.

The reproduction section 101 includes an optical head 2, a preamplifier 3, an AGC 4, a waveform equalizer 5, an A/D converter 6, and a PLL circuit 7. The reproduction section 101 generates a digital signal from an analog signal representing information reproduced from the recording medium 1.

The recording condition adjusting device 102 includes a shaping section 8, a maximum likelihood decoding section 9, a reliability calculation section 10, and an adjusting section 104. The adjusting section 104 includes a pattern detection circuit 11, an edge shift detection circuit 12, and an information recording medium controller 13. The recording condition adjusting section device 102 is produced as, for example, a semiconductor chip.

The shaping section 8 is, for example, a digital filter, and receives the digital signal generated by the reproduction section 101 and shapes the waveform of the digital signal such that the digital signal has a predetermined equalization characteristic.

The maximum likelihood decoding section 9 is, for example, a Veterbi decoding circuit, and performs maximum likelihood decoding of the digital signal having the waveform thereof shaped by the shaping section 8 to generate a binary signal having the maximum likelihood.

The reliability calculation section 10 is, for example, a differential metric detection circuit, and calculates the reliability level of the result of maximum likelihood decoding based on the digital signal having the waveform thereof shaped by the shaping section 8 and the binary signal output from the maximum likelihood decoding section 9.

The adjusting section 104 adjusts a power of a recording signal for recording information on the information recording medium 1 based on the reliability level calculated by the reliability calculation section 10, and also adjusts a shape of a predetermined part of the recording signal (for example, adjusts an edge position of the recording signal). The adjusting section 104 adjusts the power and the shape of the recording signal such that the reliability level of the result of maximum likelihood decoding is increased. The information recording medium controller 13 is, for example, an optical disc controller.

Now, the power of a recording signal will be described. Exemplary known rewritable optical discs include phase change optical discs (e.g., CD-RW, DVD-RAM, DVD-RW and Blu-ray discs). For performing overwriting on phase change optical discs, multi pulse laser light is used. The power of laser light has, for example, a write power Pw, an erase power Pe and a bottom power Pb.

FIG. 13 shows a multi pulse having a write power Pw, an erase power Pe and a bottom power Pb.

The write power Pw changes the state of a recording layer from a crystalline state to an amorphous state to form marks. The erase power Pe changes the state of the recording layer from the amorphous state to the crystalline and to erase old marks (overwrite). The bottom power Pb corresponds to the power at the bottom of the multi pulse in the multi pulse recording and prevents thermal diffusion from being caused by laser light radiation at the time of recording.

The information recording medium controller 13 adjusts the recording power for recording information on the recording medium 1 based on the reliability level calculated by the reliability calculation section 10. For example, the recording power to be adjusted includes at least one of the write power, the erase power and the bottom power. The information recording medium controller 13 adjusts the shape of a recording signal such that, for example, the reliability level of the result of maximum likelihood decoding is increased.

The recording section 103 includes a pattern generation circuit 14, a recording compensation circuit 15, a laser driving circuit 16 and the optical head 2. The recording section 103 records information on the information recording medium 1 based on the adjusting result of the power and/or shape of the recording signal. In this embodiment, the optical head 2 is shared by the reproduction section 101 and the recording section 103, and has functions of both of a recording head and a reproduction head. Alternatively, a recording head and a reproduction head may be separately provided.

Hereinafter, an operation of the recording/reproduction apparatus 100 in this embodiment will be described in detail with reference to FIG. 4.

The optical head 2 generates an analog reproduced signal representing information which is read from the information recording medium 1. The analog reproduced signal is amplified and AC-coupled by the preamplifier 3 and then is input to the AGC 4. The AGC 4 adjusts a gain of the analog reproduced signal such that the output from the waveform equalizer 5, which will later process the signal, has a constant amplitude. The analog reproduced signal which is output from the AGC 4 has the waveform thereof shaped by the waveform equalizer 5. The resultant analog reproduced signal is output to the A/D converter 6. The A/D converter 6 samples the analog reproduced signal in synchronization with a reproduction clock which is output from the PLL circuit 7. The PLL circuit 7 extracts the reproduction clock from a digital reproduced signal obtained by sampling performed by the A/D converter 6.

The digital reproduced signal generated by sampling performed by the A/D converter 6 is input to the shaping section 8. The shaping section 8 adjusts the frequency characteristics of the digital reproduced signal (i.e., shapes the waveform of the digital reproduced signal) such that the frequency characteristics of the digital reproduced signal at the time of recording and reproduction are the characteristics assumed by the maximum likelihood decoding section 9 (in this example, PR (1, 2, 2, 1) equalization characteristics).

The maximum likelihood decoding section 9 performs maximum likelihood decoding of the digital reproduced signal having the waveform thereof shaped by the shaping section 8, and thus generates a binary signal. The binary signal indicates the result of maximum likelihood decoding.

The reliability calculation section 10 receives the digital reproduced signal having the waveform thereof shaped by the shaping section 8 and the binary signal. The reliability calculation section 10 identifies a state transition from the binary signal, and obtains an index representing the reliability level of the decoding result from the identification result and a branch metric. In more detail, the reliability calculation section 10 calculates a first index (e.g., Pa) representing the likelihood of a first state transition sequence (e.g., path A) determined as having the maximum likelihood by the maximum likelihood decoding section 9 and a second index (e.g., Pb) representing the likelihood of a second state transition sequence (e.g., path B) determined as having the second maximum likelihood by the maximum likelihood decoding section 9. The reliability calculation section 10 calculates a third index (|Pa−Pb|−Pstd) obtained based on a difference between the first index and the second index. The reliability calculation section 10 also obtains indices M_SN, M_SHIFT and M from the third index.

The information recording medium controller 13 controls a recording parameter learning procedure. The information recording medium controller 13 sets recording parameters (power, shape and the like of the recording signal) for test recording, controls a recording operation and controls a reproduction operation, and also obtains indices M_SN, M_SHIFT and M for each recording parameter to determine the recording parameter at which the target index is optimum or equal to or less than a predetermined value. The details of the recording power learning procedure will be described later.

The recording compensation circuit 15 determines a laser emission pattern based on the recording parameter output from the information recording medium controller 13 and a recording test pattern output from the pattern generation circuit 14. The laser driving circuit 16 drives the optical head 2 in accordance with the laser emission pattern.

By using the recording/reproduction apparatus 100, an optimum recording parameter which minimizes error during reproduction can be set.

Now, with reference to FIGS. 10 through 12, the procedure of adjusting the power and shape of the recording signal will be described in more detail. The adjustment is performed by the adjusting section 104.

FIG. 10(a) shows a distribution of Pa−Pb in the case where the quality of the reproduced signal is poor. As compared to the distribution of Pa−Pb shown in FIG. 3(a), the distribution of Pa−Pb shown in FIG. 10(a) shows a lower incidence when Pa=0 and when Pb=0. FIG. 10(b) shows a distribution of |Pa−Pb|−Pstd corresponding to the distribution of Pa−Pb shown in FIG. 10(a). As compared to the distribution of |Pa−Pb|−Pstd shown in FIG. 3(b), the distribution of |Pa−Pb|−Pstd shown in FIG. 10(b) shows a higher degree of deviation (standard deviation $\sigma(X)$) of |Pa−Pb|−Pstd.

In such a state where the incidence when Pa=0 and when Pb=0 is low and the standard deviation σ is large, the possibility of correct maximum likelihood decoding decreases and the probability of error occurrence at the time of maximum likelihood decoding increases.

FIG. 11(a) shows a distribution of Pa−Pb in the case where the quality of the reproduced signal is good. As compared to the distribution of Pa−Pb shown in FIG. 3(a), the distribution of Pa−Pb shown in FIG. 11(a) shows a higher incidence when Pa=0 and when Pb=0. FIG. 11(b) shows a distribution of |Pa−Pb|−Pstd corresponding to the distribution of Pa−Pb shown in FIG. 11(a). As compared to the distribution of |Pa−Pb|−Pstd shown in FIG. 3(b), the distribution of |Pa−Pb|−Pstd shown in FIG. 11(b) shows a lower degree of deviation (standard deviation σ(X)) of |Pa−Pb|−Pstd. In such a state where the incidence when Pa=0 and when Pb=0 is high and the standard deviation σ(X) is small, the possibility of correct maximum likelihood decoding increases and the probability of error occurrence at the time of maximum likelihood decoding decreases. Thus, by adjusting the recording parameters so as to decrease the standard deviation σ(X), the quality of a reproduced signal can be improved and the probability of error occurrence can be decreased.

The present inventors found that the standard deviation σ(X) heavily depends on the power of the recording signal among the recording parameters (the power and shape of the recording signals, etc.) and that the standard deviation σ(X) can be decreased by adjusting the power of the recording signal to an appropriate value. Namely, a recording parameter appropriate to maximum likelihood decoding can be obtained by adjusting the power of the recording signal so as to decrease the standard deviation σ(X).

Now, with reference to FIG. 12, the procedure of adjusting the parameters of the recording signal will be further described. FIG. 12(*a*) shows another example of the distribution of Pa−Pb in the case where the quality of the reproduced signal is poor. In the left distribution of Pa−Pb in FIG. 12(*a*), the value of |Pa−Pb| at which the incidence is highest is shifted from the value of |Pa−Pb| when Pa=0. FIG. 12(*b*) shows a distribution of |Pa−Pb|−Pstd corresponding to the distribution of Pa−Pb shown in FIG. 12(*a*). In the distribution of |Pa−Pb|−Pstd shown in FIG. 12(*b*), the average value of |Pa−Pb|−Pstd is shifted from 0 by distance μ (|average value|=μ). In such a state where the average value of |Pa−Pb|−Pstd is shifted from 0 by distance μ, the possibility of correct maximum likelihood decoding decreases and the probability of error occurrence at the time of maximum likelihood decoding increases. The present inventors found that the shift of the distribution of Pa−Pb shown in FIG. 12(*a*) heavily depends on the edge position of the recording signal among the recording parameters (the power and shape of the recording signal, etc.) and that by adjusting the edge position of the recording signal to an appropriate value, the shift of the distribution of Pa−Pb can be decreased and the absolute value of the average value E(X) of |Pa−Pb|−Pstd can be decreased. Namely, a recording parameter appropriate to maximum likelihood decoding can be obtained by adjusting the edge position of the recording signal so as to decrease the absolute value of the average value (=μ).

The adjusting section 104 adjusts the power of the recording signal so as to decrease (to equal to or less than a predetermined value) the standard deviation σ(X) (the degree of deviation of |Pa−Pb|−Pstd). The adjusting section 104 also adjusts the edge position of the recording signal so as to decrease (to equal to or less than a predetermined value) the absolute value of the average value E(X) of |Pa−Pb|−Pstd (i.e., so as to decrease distance μ). More preferably, the adjusting section 104 adjusts the power and the edge position of the recording signal such that the standard deviation σ(X) and the absolute value of the average value E(X) are closer to 0.

(3. Recording/Reproduction Method)

Figure 5:
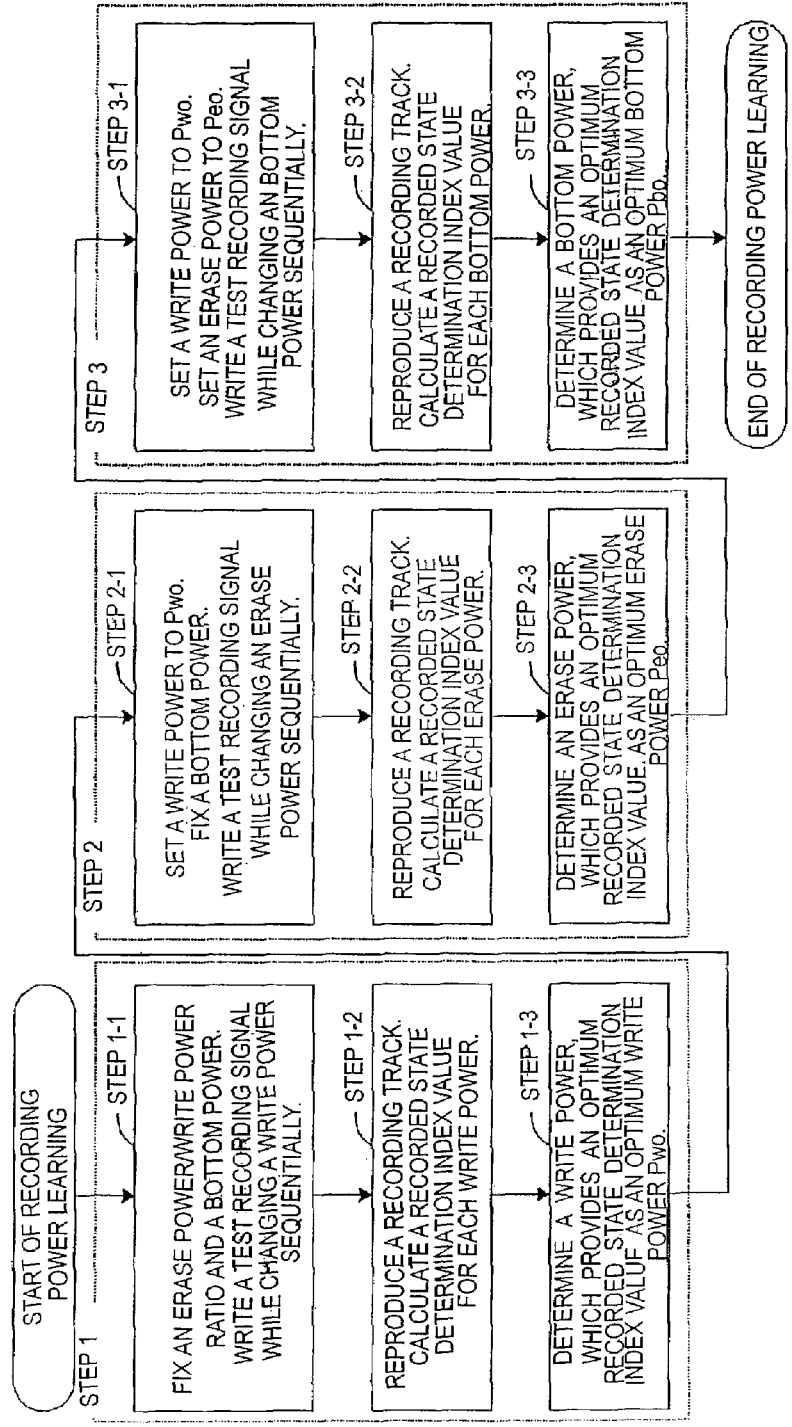
FIG. 5 shows a flow of a recording waveform learning procedure according to an embodiment of the present invention.

FIG. 5 shows a recording power learning procedure according to an embodiment of the present invention. The recording/reproduction apparatus 100 performs the recording power learning procedure to adjust a recording power. The recording power learning procedure includes steps 1 through 3.

Hereinafter, the recording power learning procedure will be described step by step with reference to FIG. 5.

At the start of the recording power learning, an optimum write power Pwo is obtained in step 1. Step 1 includes steps 1-1, 1-2 and 1-3.

Step 1-1: The optical head 2 is controlled to move to a predetermined learning area on the information recording medium 1. A test recording signal is written while changing the write power sequentially with the erase power/write power ratio (Pe/Pw) and the bottom power being fixed. In this case, the initial values of the erase power/write power ratio and the bottom power may be recommended values defined in accordance with the standards or the like and described beforehand on the recording medium 1. The write power may be changed around a recommended value described beforehand on the information recording medium 1.

The light waveform for recording, i.e., the position of the pulse in the time direction may be set to a value described beforehand on the information recording medium 1, or some initial values for the light waveform may be recorded beforehand in the apparatus.

Alternatively, recommended values stored in the recording/reproduction apparatus 100 for each recording medium may be used as initial values. For example, assuming that the recommended values described beforehand on the information recording medium 1 are Pw=9.0 [mW], Pe/Pw=0.40, and Pb=0.3 [mW], Pe is fixed to Pe=0.40×Pw [mW] and Pb is fixed to Pb=0.3 [mW] while Pw is changed from 8.0 to 10.0 [mW] by a unit of 0.2 [mW]. The same test recording signal is repeatedly recorded for each write power.

After test recording, the procedure advances to step 1-2.

Step 1-2: The optical head 2 reproduces the recorded test recording signal. The reliability calculation section 10 calculates the index M_SN for each write power.

After the reliability calculation section 10 calculates the index M_SN for each write power, the procedure advances to step 1-3.

Step 1-3: The reliability calculation section 10 determines a write power, at which the optimum index M_SN capable of decreasing the standard deviation is obtained, as the optimum write power Pwo. The reliability calculation section 10 selects, for example, the minimum value as the optimum index M_SN, and determines a write power corresponding to the selected index M_SN as the optimum write power Pwo.

Figure 6:
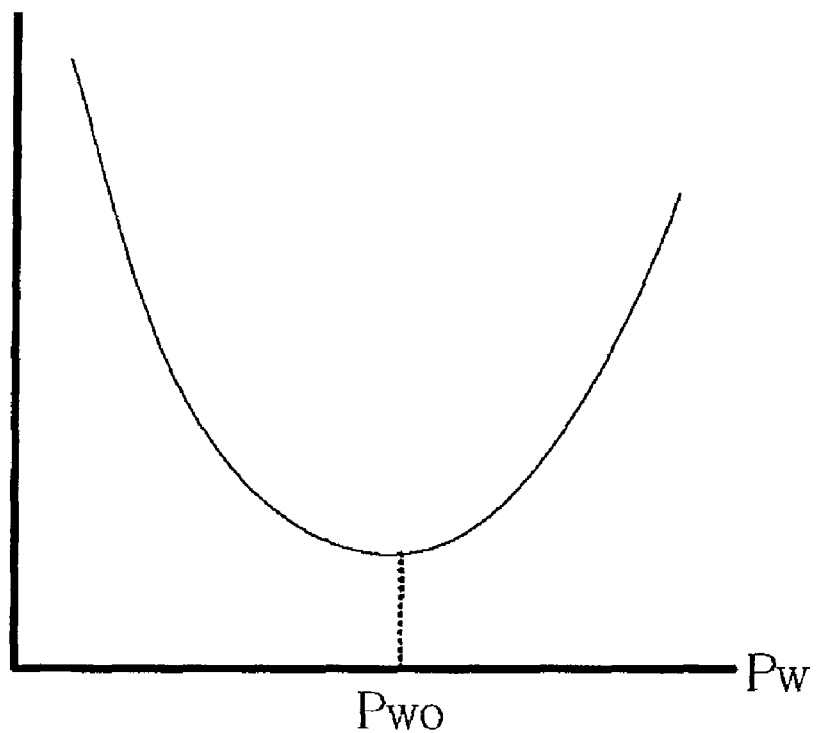
FIG. 6 shows an example of optimum write power Pwo obtained by plotting an index M_SN for each write power.

FIG. 6 shows an example of the optimum write power Pwo obtained by plotting the index M_SN for each write power.

Figure 7:
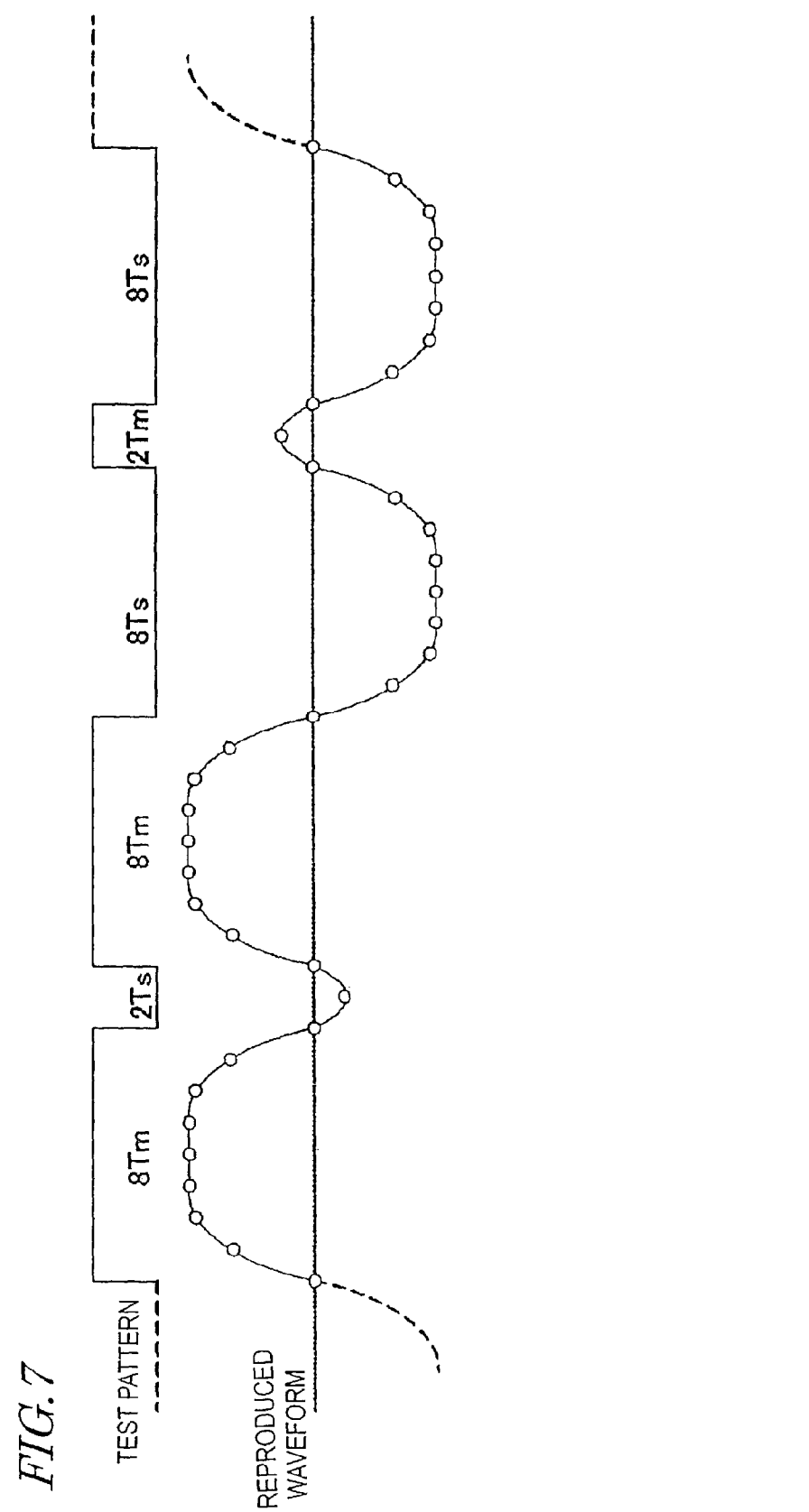
FIG. 7 shows a test pattern and a waveform obtained by reproducing the pattern.

FIG. 7 shows a test pattern and a waveform obtained by reproducing the pattern. White circles on the reproduced waveform indicate sampling points at the time of sampling performed by the A/D converter 6. The present invention is characterized by, among others, a test recording signal. Conventionally, a single pattern having a predetermined period is used as a test pattern for recording power learning. An example of such a pattern is a repeat pattern of 6T (T is a channel period). The single pattern is unlikely to be influenced by the width or phase shift of the recording pulse of each recording mark length, but may not be able to detect a change in waveform corresponding to a change in the recording power with precision. The present invention uses a test pattern in which a minimum mark length and a maximum mark length are combined and a recorded portion (mark) and an unrecorded portion (space) occur at the same probability, in accordance with a recording modulation rule. For example, when the (1, 7) Run Length Limited code is used as the recording modulation code, the minimum mark length is 2T and the maximum mark length is 8T. Thus, a repeat pattern of 8Tm2Ts8Tm2Ts8Tm2Ts is used. Tm represents a channel period length of marks, and Ts represents a channel period length of spaces.

As described above, in step 1, the write power at which the optimum index M_SN is obtained is determined as the optimum write power Pwo.

Then, in step 2, an optimum erase power Peo is obtained. Step 2 includes steps 2-1, 2-2 and 2-3.

Step 2-1: The information recording medium controller 13 sets the optimum write power Pwo determined in step 1 as the write power. The information recording medium controller 13 writes a test recording signal while changing the erase power sequentially with the bottom power being fixed (test recording).

For example, Pwo and Pb are fixed to Pwo=Pw=[mW] and Pb=0.3 [mW] respectively, while Pe is changed from 3.4 to 4.1 [mW] by a unit of 0.1 [mW] around Pe=Pw×0.4=3.76 [mW]. The same test recording signal is repeatedly recorded for each erase power. This recording may be performed as an operation of overwriting data already recorded on a track. This recording may also be performed on the same track as that used in step 1.

After writing of the test recording signal (test recording) is finished, the procedure advances to step 2-2.

Step 2-2: The optical head 2 reproduces the recorded test recording signal. The reliability calculation section 10 calculates a recorded state determination index value (index M_SN) for each erase power.

As in step 1, the index M_SN is used as a recorded state determination index, and the repeat pattern of 8Tm2Ts8Tm8Ts2Tm8Ts is used as the test recording signal.

After the reliability calculation section 10 calculates the recorded state determination index value for each erase power, the procedure advances to step 2-3.

Step 2-3: The reliability calculation section 10 determines an erase power, at which the optimum index M_SN capable of decreasing the standard deviation is obtained, as the optimum erase power Peo. The reliability calculation section 10 selects, for example, the minimum value as the optimum index M_SN, and determines an erase power corresponding to the selected index M_SN as the optimum erase power Peo.

Figure 8:
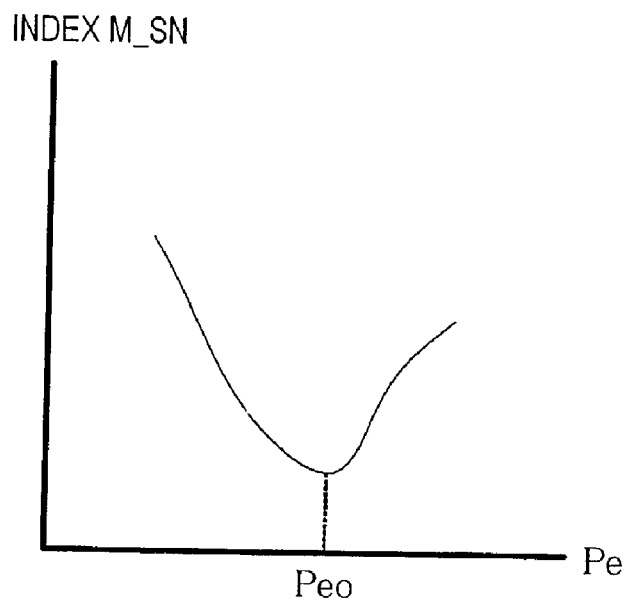
FIG. 8 shows an example of optimum erase power Peo obtained by plotting the index M_SN for each erase power.

FIG. 8 shows an example of the optimum erase power Peo obtained by plotting the index M_SN for each erase power.

Then, in step 3, an optimum bottom power Pbo is obtained. Step 3 includes steps 3-1, 3-2 and 3-3.

Step 3-1: The information recording medium controller 13 sets the optimum write power Pwo determined in step 1 as the write power. The information recording medium controller 13 sets the optimum erase power Peo determined in step 2 as the erase power. The information recording medium controller 13 also writes a test recording signal while changing the bottom power sequentially (test recording).

For example, Pwo and Pb are fixed to Pwo=Pw=9.4 [mW] and Peo=Pe=0.3 [mW] respectively, while Pb is changed from 0.2 to 0.4 [mW] by a unit of 0.05 [mW]. The same test recording signal is repeatedly recorded for each bottom power. This recording may be performed as an operation of overwriting data already recorded on a track. This recording may also be performed on the same track as that used in step 1 or 2.

After writing of the test recording signal (test recording) is finished, the procedure advances to step 3-2.

Step 3-2: The optical head 2 reproduces the recorded test recording signal. The reliability calculation section 10 calculates a recorded state determination index value (index M_SN) for each bottom power. As in steps 1 and 2, the index M_SN is used as the recorded state determination index, and the repeat pattern of 8Tm2Ts8Tm8Ts2Tm8Ts is used as the test recording signal.

After the reliability calculation section 10 calculates the recorded state determination index value for each bottom power, the procedure advances to step 2-3.

Step 3-3: The reliability calculation section 10 determines a bottom power, at which the optimum index M_SN capable of decreasing the standard deviation is obtained, as the optimum erase power Pbo. The reliability calculation section 10 selects, for example, the minimum value as the optimum index M_SN, and determines an erase power corresponding to the selected index M_SN as the optimum erase power Pbo.

Figure 9:
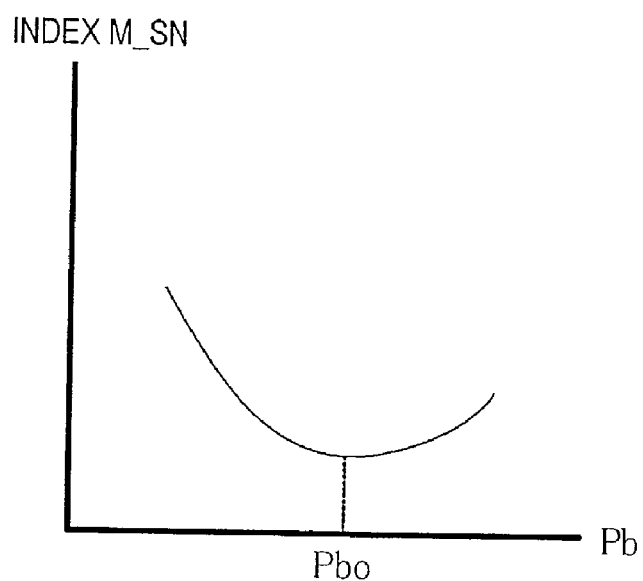
FIG. 9 shows an example of optimum bottom power Pbo obtained by plotting the index M_SN for each bottom power.

FIG. 9 shows an example of the optimum bottom power Pbo obtained by plotting the index M_SN for each bottom power.

By performing steps 1 through 3 as described above, the learning procedure for setting the optimum write power, erase power and bottom power is finished, and recording which minimizes error during reproduction can be performed. Note that when a change in the bottom power has substantially no influence on the readability during reproduction, learning in step 3 may be omitted and the bottom power may be set to an appropriate fixed value.

As described above, according to this embodiment of the present invention, among a number of state transition patterns in the PRML algorithm, a metric expected value error (index M_SN) of only a state transition pattern concerning the vicinity of an edge of the reproduced waveform (pattern with the minimum Euclid distance) is used to detect the recorded state. Thus, a recorded waveform changed in correspondence to a change in the power of a recording leading pulse (write power), the power of a cooling pulse (bottom power), or the write power/erase power ratio can be detected with high precision. In addition, the repeat pattern of 8Tm2Ts8Tm8Ts2Tm8Ts is used as a test pattern since, for example, this pattern is unlikely to be influenced by the width or phase shift of the recording pulse of each recording mark length and is suitable to detect a change in the waveform in correspondence to a change in the recording power with high sensitivity. Thus, the detection sensitivity can be further improved with ease.

The test pattern is not limited to the pattern in this embodiment and may be a single period pattern. In an optical disc for repeated recording, test recording with a pattern which combines the minimum length marks and spaces and maximum length marks and spaces is especially effective to determine the power in consideration of the erasability. For only optimizing the write power or when using a write-once optical disc, a single period pattern of the maximum length, or a single period pattern of a length which is shorter than the maximum length but provides approximately the same reproduction amplitude as the maximum length, may be used.

In this embodiment, the write power, the erase power and the bottom power are determined separately, but they may be determined together.

In this embodiment, as shown in FIG. 13, a power immediately before the erase power is set as the bottom power. Alternatively, the power immediately before the erase power may be set differently from the bottom power. A middle part of the mark in which pulses are continued periodically, and an end part of the mark which is immediately followed by the erase power, have different thermal distributions. Therefore, by setting the power immediately before the erase power differently from the bottom power, the deviation in the end part of the mark can be reduced.

In this embodiment, the power at which M_SN is minimum is selected as the optimum power. Alternatively, a power which is in the vicinity of the minimum power and fulfills the condition that M_SN is equal to or less than a predetermined value may be selected as the optimum power. Especially in an optical disc for repeated recording, a smaller write power reduces the influence of the thermal damage at the time of repeated recording and increases the number of times that recording can be performed.

In this embodiment, a power at which M_SN is minimum is selected as the optimum power. Alternatively, a power which is around the center of the power range and fulfills the condition that M_SN is equal to or less than a predetermined value may be selected as the optimum power. With such an optimum power, even when the effective radiation power is slightly increased or decreased by a sensitivity difference in the plane of the optical disc, a predetermined S/N ratio can be guaranteed. In the case where the effective radiation power is estimated to be increased or decreased with a certain level of clarity, a power obtained by internally dividing a power range which fulfilling the condition that M_SN is equal to or less than a predetermined value in accordance with the estimate may be selected. For example, for performing recording in an area of the optical disc close to the outer periphery thereof using a power which is set by the test recording performed in an inner area of the optical disc, the effective radiation power is decreased due to the warp of the optical disc. In such a case, the internal division ratio may be determined beforehand such that a higher power is obtained.

Now, a procedure of determining the shape of a recording signal will be described.

The pattern detection circuit 11 generates a pulse signal for assigning the 8 patterns shown in Table 2 (Pattern-1 through Pattern-8 shown in FIG. 18) for each pattern of the start or termination edge of the recording marks based on the binary signal, and outputs the pulse signal to the edge shift detection circuit 12.

The edge shift detection circuit 12 accumulatively adds the reliability level Pabs pattern by pattern, and obtains a shift of the recording compensation parameter from the optimum value thereof (referred to as the "edge shift" later).

The information recording medium controller 13 changes a recording parameter (waveform of the recording signal) which is determined to need to be changed based on the edge shift amount for each pattern.

The pattern generation circuit 14 outputs a recording compensation learning pattern.

Based on the recording parameter from the information recording medium controller 13, the recording compensation circuit 15 generates a laser emission waveform pattern in accordance with the recording compensation learning pattern. In accordance with the generated laser emission waveform pattern, the laser driving circuit 16 controls a laser light emission operation of the optical head 2.

Figure 14:
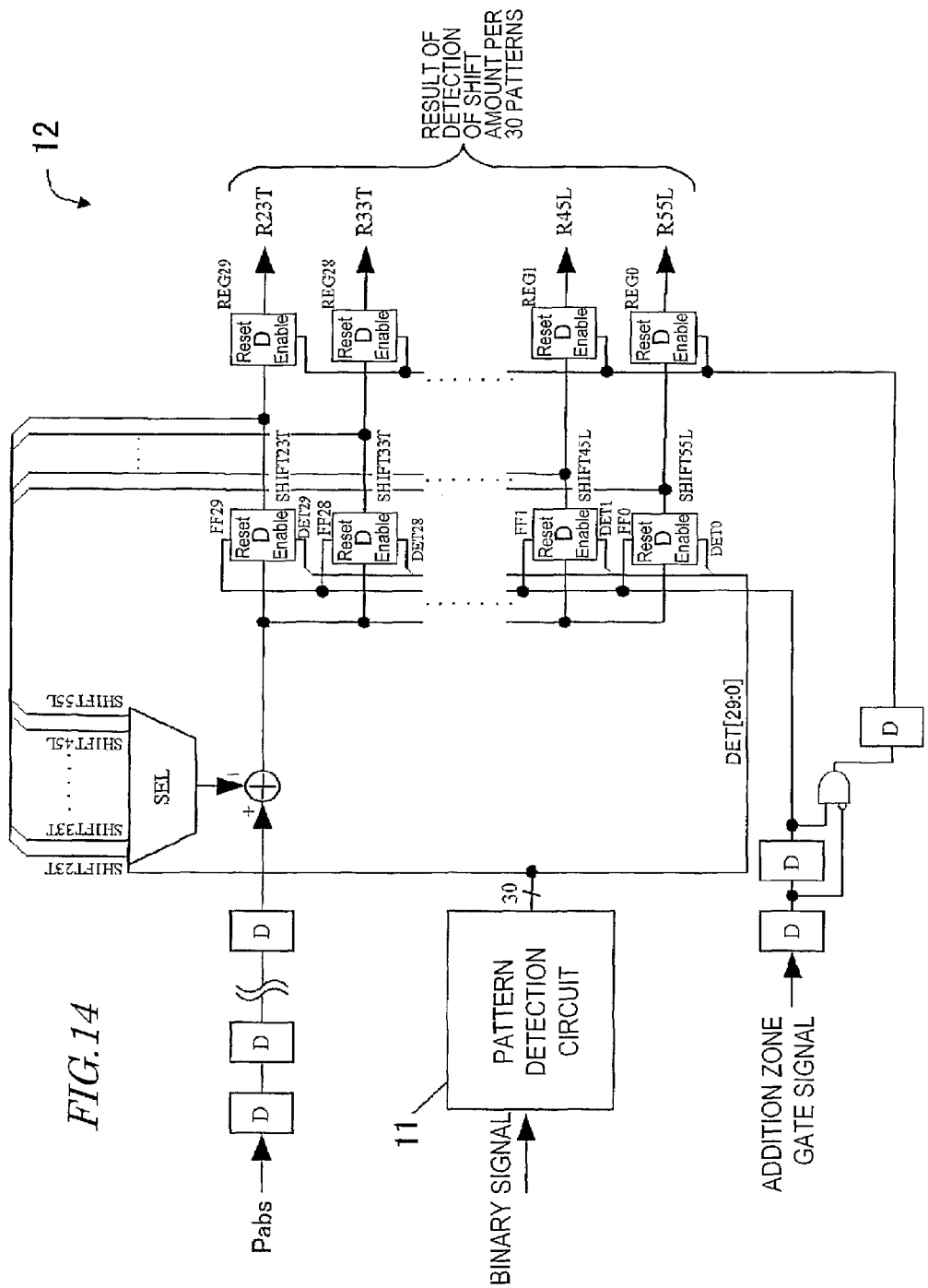
FIG. 14 is a diagram showing a pattern detection circuit and an edge shift detection circuit.

FIG. 14 shows the pattern detection circuit 11 and the edge shift detection circuit 12.

Hereinafter, an operation of the edge shift detection circuit 12 will be described in detail with reference to FIG. 14.

The edge shift detection circuit 12 receives a pattern detection result obtained by the pattern detection circuit 11 and the reliability level Pabs calculated by the reliability calculation section 10. The edge shift detection circuit 12 delays the input reliability level Pabs data by a flip-flop (FF) in consideration of a delay caused by the pattern detection circuit 11. The reliability level Pabs data corresponding to the pattern detection output and the detection output point is input to an adder, and the pattern detection result is input to a selector at the same time. The selector selects an accumulative addition result obtained up to that point in accordance with the detection pattern and inputs the selected result to the adder. The adder adds the accumulative addition result and the newly input reliability level Pabs data, and outputs the addition result. A specific register corresponding to the detection pattern, upon receiving an enable signal, stores the addition result.

Figure 15:
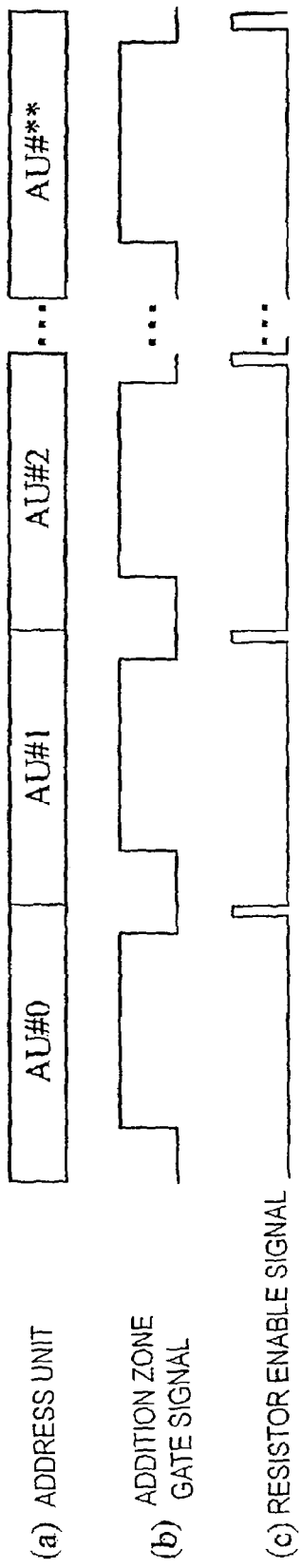
FIG. 15 is a timing diagram showing an operation of the edge shift detection circuit.

FIG. 15 is a timing diagram showing the operation of the edge shift detection circuit. For example, for recording information on an information recording medium in which information is managed address by address, it is considered to use an addition zone gate signal (see FIG. 15(b)) and a register enable signal (see FIG. 15(c)). FIG. 15(a) shows an address unit.

For performing test recording in a user area address by address to obtain an edge shift amount, a control operation needs to be performed for defining an addition zone. When an addition zone gate signal is input to the edge shift detection circuit 12, the addition zone gate signal passes through two stages of flip-flops and is input to flip-flops FF29 through FF0 (see FIG. 14). The flip-flops are reset in a low zone of the addition zone gate signal, and the addition result is stored in a high zone. The register enable signal is generated from the addition zone gate signal. The register enable signal is an enable signal for storing the addition result in registers REG29 through REG0 at the end of the addition zone gate signal. Data representing the edge shift amount address by address is stored in the registers REG29 through REG0.

Owing to such a circuit configuration, the edge shift detection circuit 12 can obtain all the edge shift amounts necessary for optimizing the recording parameter using one adder.

In the exemplary circuit described with reference to FIG. 14, in one recording pattern used for test recording (e.g., random pattern), the incidence at which each combination of marks and spaces having a predetermined length necessary for optimizing the parameter occurs is different. The 30 edge shift amounts detected (R23T, R33T, . . . R45L, R55L) depend on the incidence of occurrence of each pattern. The PLL circuit 7 (FIG. 4) automatically detects a threshold value of a slicer using a DC component (low frequency component included in the reproduced signal) and synchronizes the reproduced signal and the clock signal. Accordingly, it is desired that the amount of the DC component included in the test recording pattern is as small as possible, in order to prevent the feedback control from influencing the clock generation performed by the PLL circuit 7. In consideration of the time required for the optimization and the optimization precision, it is desired to obtain a highly precise detection result with a minimum possible recording area. This requires a recording pattern in which the mark/space combinations necessary for optimizing the parameter occur at the same incidence, the DC component (DSV) included in the code is 0, and the incidence at which the combinations necessary for optimization occur per unit length is high.

FIG. 16 shows an example of a recording pattern for learning. 2M represents a 2T mark, and 2S represents a 2T space. Each of 30 patterns of combinations of 2T through 5T marks and 2T through 5T spaces occurs once in a 108-bit recording pattern. The number of symbols "0" and the number of symbols "1" each including the 108-bit recording pattern are both 54, and the DSV in the recording pattern is 0. By applying this recording pattern to the edge shift detection circuit 12 in FIG. 4, each pattern can be detected the same number of times. Thus, a more accurate shift amount detection result is obtained. In this embodiment, it is assumed that 5T or longer marks or spaces can be recorded with the same recording parameter.

Figure 17:
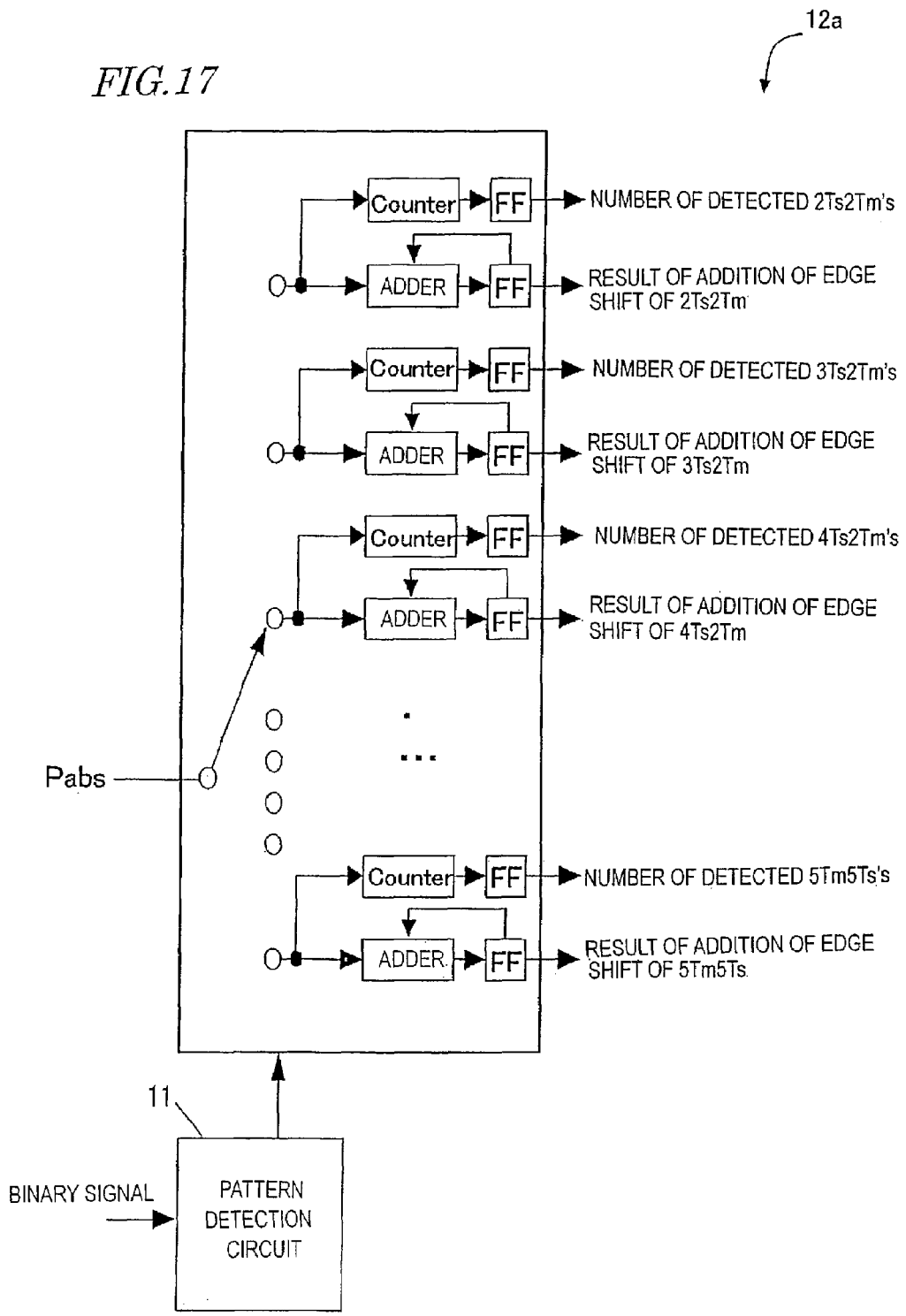
FIG. 17 is a diagram showing an edge shift detection circuit 12a (which is a modification of the edge shift detection circuit 12).

FIG. 17 shows an edge shift detection circuit 12a (a modification of the edge shift detection circuit 12).

The edge shift detection circuit 12a uses a random pattern (pattern which occurs at a different incidence in accordance with the mark/space combination required for optimization) as the recording pattern used for test recording. After the pattern detection circuit 11 detects an edge of each of specific patterns (30 patterns), the edge shift detection circuit 12a accumulatively adds the edge shift amounts of each pattern and accumulatively counts the number of times that the respective pattern has been detected. The edge shift detection circuit 12a divides each addition result of the edge shift amounts with the total number of times that the respective pattern has been detected to obtain an average edge shift amount of each specific pattern. Owing to this, even when a specific recording pattern which occurs at a different incidence in accordance with the mark/space combination is used for test recording, it can be determined which is the pattern corresponding to the recording mark having the start or termination edge position that should be changed.

As described above, the edge shift detection circuit 12 (FIG. 14) included in the adjusting section 104 calculates one of an addition value or an average value of the reliability levels of the maximum likelihood decoding result for each combination of recording mark length and space length, and adjusts the shape of the recording signal based on the calculated addition value or average value.

In the above embodiment, the maximum likelihood decoding section performs maximum likelihood decoding using a state transition rule defined by the recording code having a minimum polarity inversion interval of 2 and the equalization system PR (1, 2, 2, 1). The present invention is not limited to this. The present invention is applicable to using, for example, a state transition rule defined by a recording code having a minimum polarity inversion interval of 3 and an equalization system PR (C0, C1, C1, C0), a state transition rule defined by a recording code having a minimum polarity inversion interval of 2 or 3 and an equalization system PR (C0, C1, C0), or a state transition rule defined by a recording code having a minimum polarity inversion interval of 2 or 3 and an equalization system PR (C0, C1, C2, C1, C0). C0, C1 and C2 are each an arbitrary positive numeral.

In this embodiment of the present invention, 8 patterns (FIG. 18) are detected for each recording pattern described later (for each pattern including a combination of a mark length and a space length immediately therebefore, and for each pattern including a combination of a mark length and a space length immediately thereafter). The recording parameter for optimizing the edge position of the recording signal is determined, with specific attention being paid to the shape of the recording signal, especially the shape of the start or terminal edge.

Paying attention only to the pattern having the minimum |Pa−Pb| value, among all the patterns having the reliability level |Pa−Pb| as the maximum likelihood decoding results, means paying attention only to the edge of the recording mark. As described above, a pattern having a small value of Pa−Pb has a high probability of error occurrence. This means that by partially optimizing the edge position of the recording mark so as to improve the reliability level of the maximum likelihood decoding result, the entire recording parameter is optimized. A method for such an operation will be described hereinafter.

Figure 18:
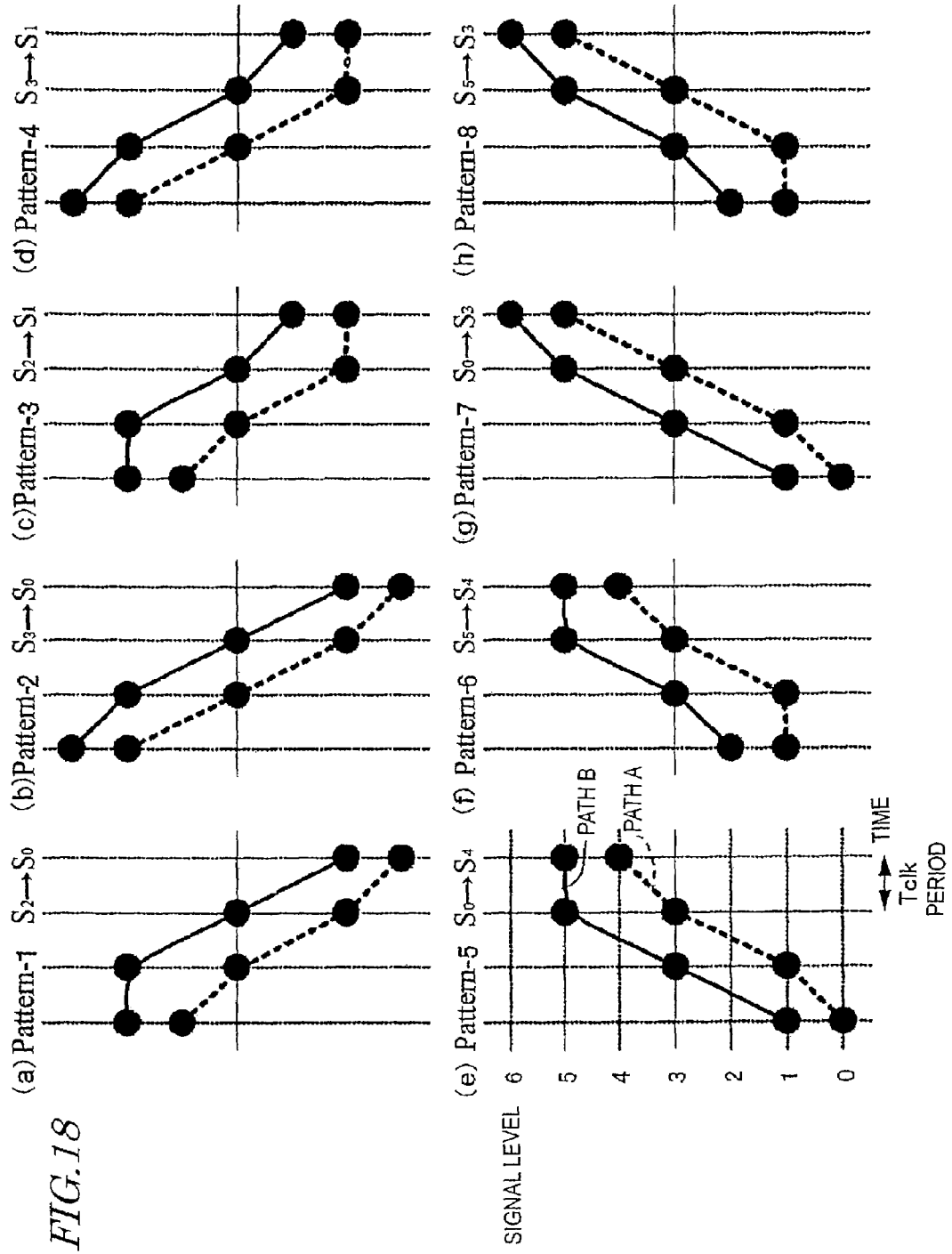
FIG. 18 shows sample values of 8 patterns (Pattern-1 through Pattern-8).

FIG. 18 shows sample values of 8 patterns (Pattern-1 through Pattern-8). The horizontal axis represents time (one scale represents one channel clock period (Tclk)), and the vertical axis represents signal level (0 through 6). The dashed line represents the path A, and the solid line represents the path B. Each sample value corresponds to each of the input expected values Level$_v$ 0 through 6 of maximum likelihood decoding described above with reference to Table 1.

A recorded portion (amorphous area) is reproduced as having a signal level below the threshold value of the comparator since the light amount reflected by the recorded portion is smaller than the light amount reflected by the other portions. An unrecorded area (non-amorphous area) is reproduced as having a signal level above the threshold value of the comparator. The 8 patterns shown in FIG. 18 each correspond to a reproduced waveform of a border between a recorded portion (mark) and an unrecorded portion (space) (i.e., the border is a start or termination edge of the mark). Among the 8 patterns, Pattern-1 (see FIG. 18(*a*)), (see FIG. 18(*b*)), Pattern-3 (see FIG. 18(*c*)) and (see FIG. 18(*d*)) each correspond to a mark start edge. Pattern-5 (see FIG. 18(*e*)), Pattern-6 (see FIG. 18(*f*)), Pattern-7 (see FIG. 18(*g*)) and Pattern-8 (see FIG. 18(*h*)) each correspond to a mark termination edge.

A method for detecting a shift of the mark start edge will be described using Pattern-1 as an example.

Figure 19:
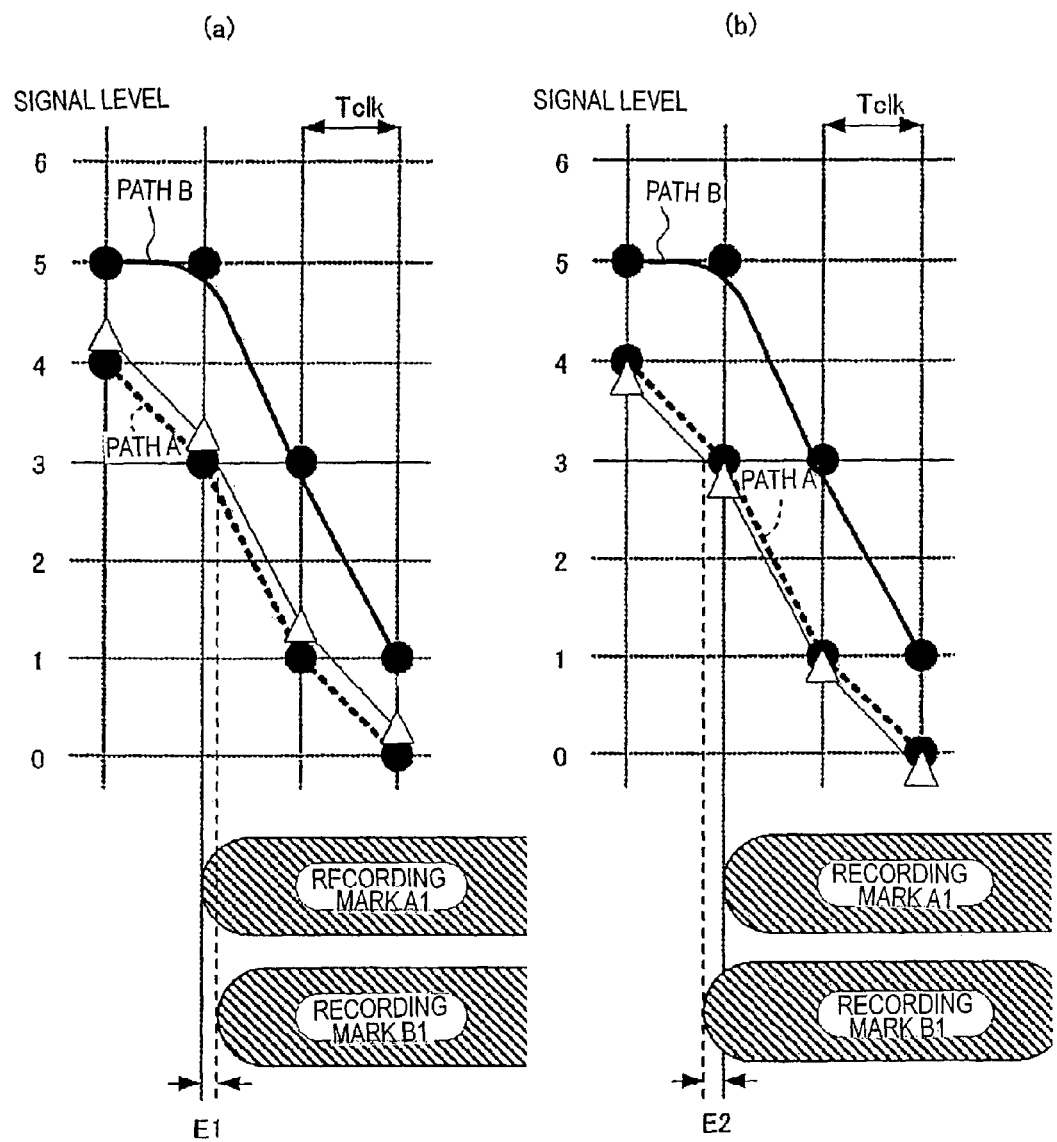
FIG. 19 shows the correlation between a reproduced waveform and the shift of a recording mark in Pattern-1.

FIG. 19 shows the correlation between the reproduced waveform and the shift of the recording mark in Pattern-1. The solid triangle (Δ) represents an input signal. The path A represented by the dashed line is assumed to be the correct state transition path. The input signal is generated based on a recording mark B1. A recording mark A1 has an ideal position of the mark start edge.

In FIG. 19(*a*), the position of the mark start edge of the recording mark is behind the ideal position. The sample value of the input signal ($y_{k-3}$, $y_{k-2}$, $y_{k-1}$, $y_k$) is (4.2, 3.2, 1.2, 0.2). From expressions 2 and 3, a distance Pa between the path A and the input signal, and a distance Pb between the path B and the input signal, are obtained by expressions 10 and 11, respectively.

$$Pa=(4.2-4)^2+(3.2-3)^2+(1.2-1)^2+(0.2-0)^2=0.16 \quad \text{Expression 10}$$

$$Pb=(4.2-5)^2+(3.2-5)^2+(1.2-3)^2+(0.2-1)^2=7.76 \quad \text{Expression 11}$$

The amount and direction of the shift of the mark start edge are obtained by calculating |Pa−Pb|−Pstd described above.

$$E1=|Pa-Pb|-Pstd=|0.16-7.76|-10=-2.4 \quad \text{Expression 12}$$

The absolute value of E1 obtained by expression 12 is the shift amount, and the sign of E1 is the shift direction. Namely, in the case of FIG. 19(*a*), E1=−2.4 is detected. Thus, it is determined that the position of the mark start edge is shifted rearward from the reference by 2.4.

In the above, the determination is made based on one piece of data for the sake of simplicity. In actuality, the determination is made based on an average value E(X) of the same pattern in a predetermined area.

Now, in FIG. 19(*b*), the position of the mark start edge of the recording mark B1 is advanced to the ideal position. The sample value of the input signal ($y_{k-3}$, $y_{k-2}$, $y_{k-1}$, $y_k$) is (3.8, 2.8, 0.8, −0.2). E2=2.4 is obtained from E2 (=|Pa−Pb|−Pstd). In the case of FIG. 19(*b*), it is determined that the position of the mark start edge is shifted forward from the reference by 2.4.

FIG. 20 shows the correlation between the reproduced waveform and the shift of the recording mark in Pattern-1. In FIG. 20, the path B is assumed to be the correct state transition path.

In FIG. 20(*a*), the position of the mark start edge of the recording mark is behind to the ideal position. The sample value of the input signal ($y_{k-3}$, $y_{k-2}$, $y_{k-1}$, $y_k$) is (5.2, 5.2, 3.2, 1.2). E3=2.4 is obtained from E3 (=|Pa−Pb|−Pstd). In the case of FIG. 20(*a*), it is determined that the position of the mark start edge is shifted rearward from the reference by 2.4.

In FIG. 20(*b*), the position of the mark start edge of the recording mark is advanced to the ideal position. The sample value of the input signal ($y_{k-3}$, $y_{k-2}$, $y_{k-1}$, $y_k$) is (4.8, 4.8, 2.8, 0.8). E4=−2.4 is obtained from E4 (=|Pa−Pb|−Pstd). In the case of FIG. 20(*b*), it is determined that the position of the mark start edge is shifted forward from the reference by 2.4.

In the case where the path A is the correct state transition path (see FIG. 19) and in the case where the path B is the correct state transition path (see FIG. 20), the sign representing the shift direction of the start edge of the recording mark is opposite. The sign depends on the relationship between the expected value sequence of the correct state transition path and the input signal sequence, and the relationship between the expected value sequence of the other candidate path and the input signal sequence. In the case where the error between the input signal sequence and the expected value sequence of the incorrect candidate path is large as described above with reference to FIGS. 19(*b*) and 20(*a*), the value obtained by expression 12 has a positive sign. Namely, as the difference between the input signal sequence and the expected value sequence of the incorrect candidate path becomes larger, the probability of error occurrence of maximum likelihood decoding is lower. In this case, the value obtained by expression 12 has a positive sign. The shift direction of the position of the mark start edge of the recording mark can be detected in consideration of this feature.

In the case where the path A is the correct state transition path in Pattern-1, Pattern-1 is used for detecting the start edge having a combination of a 2T space and a 4T or longer mark. In the case where the path B is the correct state transition path in Pattern-1, Pattern-1 is used for detecting the start edge having a combination of a 3T space and a 3T or longer mark.

Using the above-described method, an addition value or an average value of each start edge/termination edge pattern of the recording mark is obtained, and a recording parameter is set such that the shift amount of the position of the start or termination edge is close to 0. Thus, a recording control optimum for the maximum likelihood decoding method is realized.

It is important to determine whether the start/termination edge of a mark formed on a disc is shifted rearward or forward with respect to the reference position. For determining this, the pattern having a shifted edge needs to be detected. The shift amount is detected for each pattern.

As described above with reference to FIGS. 19 and 20, the sign representing the shift direction of the mark start edge of the recording mark is opposite. Therefore, for example, when the mark is shorter than the reference, the shift direction may be represented by a negative sign; whereas when the mark is longer than the reference, the shift direction may be represented by a positive sign. According to this rule, the above-described error value may be analyzed for the start edge and termination edge of each mark length. Then, the length of the start edge and the termination edge of the mark length of interest can be detected, and thus the direction for correction can be determined. In addition, the amount for correction can also be predicted based on the absolute value of the detected value.

In the case where the path A is the correct state transition path as shown in FIG. 19, the position of the mark start edge may be adjusted such that the reproduced signal (represented with Δ) passes through the path shown in FIG. 19(*b*) instead of path shown in FIG. 19(*a*). Ideally, the position of the mark start edge should be adjusted such that the reproduced signal matches the path A, but in actual operation, the reproduced signal is slightly shifted from the path A. Even when the waveform of the reproduced signal is disturbed in this way, the probability that the reproduced signal passes through the path B by mistake can be lowered as long as the position of the mark start edge is adjusted such that the reproduced signal passes through a path farther from the incorrect path B.

Similarly, in the case where the path B is the correct state transition path as shown in FIG. 20, the position of the mark start edge may be adjusted such that the reproduced signal passes through the path shown in FIG. 20(*a*) instead of the path shown in FIG. 20(*b*). With such adjustment, even when the waveform of the reproduced signal is disturbed, the probability that the reproduced signal passes through the incorrect path A by mistake can be lowered because the position of the mark start edge is adjusted such that the reproduced signal passes through a path farther from the incorrect path A.

Now, optimization of a recording parameter will be described. The minimum polarity inversion interval of a recording code is represented by m (in this embodiment, m=2). The position of the start edge of a mark formed on a recording medium depends on the length of the space immediately before the mark and the length of the mark itself. For example, when the length of the space immediately before the mark is mT to (m+b)T, the position of the mark start edge depends on the length of the space immediately therebefore. When the length of the space immediately therebefore is greater than (m+b)T, the position of the mark start edge does not depend on the length of the space immediately therebefore. When the length of the mark itself is mT to (m+a)T, the position of the mark start edge depends on the length of the mark itself. When the length of the mark itself is greater than (m+a)T, the position of the mark start edge does not depend on the length of the mark itself.

The position of the termination edge of a mark formed on a recording medium depends on the length of the mark itself and the length of the space immediately after the mark. For example, when the length of the mark itself is mT to (m+a)T, the position of the mark termination edge depends on the length of the mark itself. When the length of the mark itself is greater than (m+a)T, the position of the mark termination edge does not depend on the length of the mark itself. When the length of the space immediately after the mark is mT to (m+b)T, the position of the mark termination edge depends on the length of the space immediately thereafter. When the length of the space immediately thereafter is greater than (m+b)T, the position of the mark termination edge does not depend on the length of the space immediately thereafter. In the above, "a" and "b" are each an integer of 0 or greater, and the minimum polarity inversion interval of the recording code is greater than m+a and m+b.

Because of the above-described dependence of the position of the mark start edge and the position of the mark termination edge, the optimization of the start edge parameter Tsfp needs to be performed on a mark adjacent to a space having a length of (m+b)T or less. The optimization of the termination edge parameter Telp needs to be performed on a mark having a length of (m+a)T or less.

FIG. 21 shows a list of recording parameters requiring optimization. Where, for simplicity, m=3 and a=b=3, the parameters need to be optimized for 32 recording patterns. For example, 2Ts2Tm represents a pattern in which a 2T space exists immediately before a 2T mark.

FIG. 22 shows which of the specific eight patterns is to be used to detect each recording parameter requiring optimization. In other words, which of the above 8 patterns (Pattern-1 to Pattern-8) is to be used to detect each recording pattern (i.e., edge pattern) is shown.

For example, the P3A pattern is used to detect the shift amount of the signal corresponding to the 2Ts3Tm recording pattern at the start edge/termination edge of the recording mark (see FIG. 21). P3A is a Pattern-3 in which the path A is the correct state transition path.

The P1B or P4A pattern is used to detect the shift amount of the signal corresponding to a 3Ts3Tm recording pattern (see FIG. 21). P1B is a Pattern-1 in which the path B is the correct state transition path. P4A is a Pattern-4 in which the path A is the correct state transition path.

As can be appreciated from the above, a method for controlling the recording parameter optimum for the maximum likelihood decoding method is to change the recording parameter such that the shift amount of the signal corresponding to each of the recording patterns at the start edge/termination edge of the recording mark (see FIG. 22) is as close as possible to 0.

The shift amount of the signal corresponding to each of a 2Ts2Tm recording pattern (a 2T space is present immediately before a 2T mark which is at the rise) and a 2Tm2Ts recording pattern (a 2T space is present immediately after a 2T mark which is at the fall) cannot be detected by any of the 8 patterns (Pattern-1 through Pattern-8). Thus, the edge shift amount needs to be optimized by another method (see FIG. 22). A pattern including the 2Ts2Tm recording pattern or the 2Tm2Ts recording pattern have a relatively large value of reliability level Pa–Pb and thus is not included in the above 8 patterns. In other words, at the mark start edge or mark termination edge having the 2Ts2Tm or 2Tm2Ts pattern, the probability of error occurrence is low by the maximum likelihood decoding even if these edges are not optimized precisely. Therefore, an appropriate initial value may be used as the recording parameter instead of performing optimization for each disc. Alternatively, the 2Ts2Tm recording pattern and the 2Tm2Ts recording pattern may be optimized such that the accumulation value of the phase errors of the reproduced signal is minimal.

In the above, the method for adjusting the recording power and the method for adjusting the recording waveform are described. As shown in FIG. 23, a change in the index M_SN is larger and a change in the index M_SHIFT is slightly smaller with respect to a change in the recording power. A change in the index M_SHIFT is larger and a change in the index M_SN is smaller with respect to a change in the recording waveform, especially the positions of the leading and trailing pulses. Namely, the influence of the recording waveform with respect to the adjustment of the recording power is small. In this case, the "recording waveform" especially means the shape of the leading pulse and the trailing pulse in the time direction. Therefore, it is desirable to adjust the recording power before adjusting the recording waveform, and to adjust the recording waveform after a predetermined M_SN is obtained.

Figure 24A:
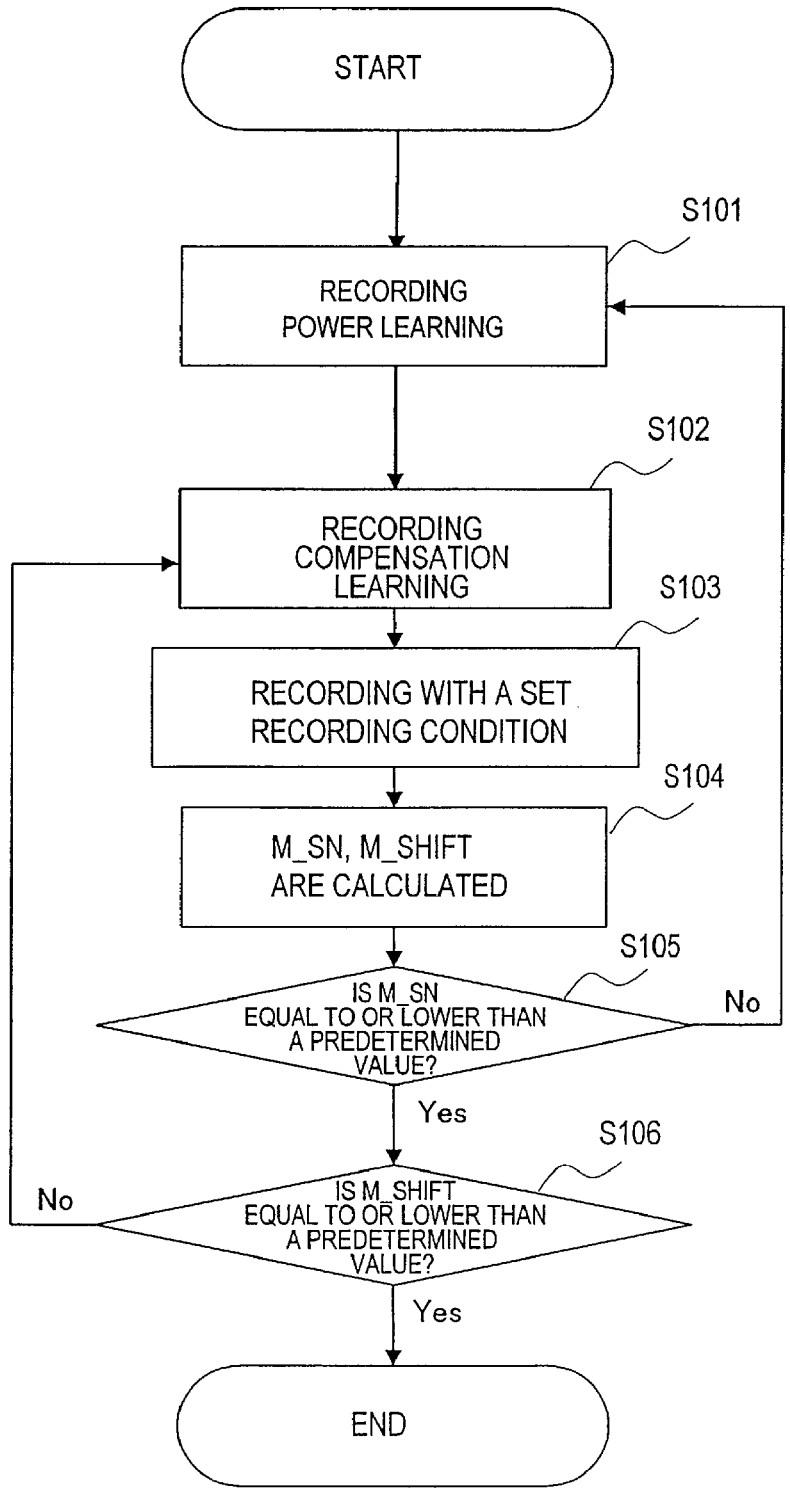
FIG. 24A is a flowchart showing a recording parameter optimization procedure of adjusting a recording waveform after a recording power is adjusted.

FIG. 24A is a flowchart showing a procedure of optimizing the recording parameter, by which the recording waveform is adjusted after the recording power is adjusted. Referring to FIG. 24A, after the recording power learning is performed for the recording power adjustment, the recording compensation learning is performed for the recording waveform adjustment (steps S101 and S102). The details of the recording power learning and the recording compensation learning are as described above.

Next, recording is performed under the recording conditions (recording power and recording waveform) set as a result of the learning (step S103). For the recording, the recording pattern for learning shown in FIG. 16 may be used or a random recording pattern may be used.

Next, the recorded information is reproduced, and the index M_SN and the index M_SHIFT are calculated from the reproduced signal (step S104). In step S105, the calculated index M_SN is compared against a predetermined value. When the index M_SN is determined to be larger than the predetermined value, that means that the recording power is not appropriately set. Thus, the procedure is returned to step S101 to execute the recording power learning again. When the index M_SN is determined to be equal to or smaller than the predetermined value, that means that the recording power is appropriately set. Thus, the procedure is advanced to step S106.

In step S106, the calculated index M_SHIFT is compared against a predetermined value. When the index M_SHIFT is determined to be larger than the predetermined value, that means that the recording waveform is not appropriately set. Thus, the procedure is returned to step S102 to execute the recording compensation learning again. When the index M_SHIFT is determined to be equal to or smaller than the predetermined value, that means that the recording waveform is appropriately set. Thus, the recording parameter adjustment is completed.

The recording parameter may be readjusted in accordance with a change in the operation environment even while user data is being recorded. For example, a temperature sensor may be attached to an optical pickup device to readjust the recording parameter in accordance with a temperature change in the optical pickup device. Alternatively, the recording parameter may be monitored by calculating the index periodically during the recording operation, and the recording parameter may be readjusted in real time whenever the value of the index is deteriorated.

When a temperature change is detected, the recording parameter may be readjusted, after the recording operation is once suspended and the optical pickup device is moved to an OPC area 212 shown in FIG. 32, in accordance with the flowchart shown in FIG. 24 or any of the flowcharts shown in FIG. 24B or 24C as described below.

Figure 24B:
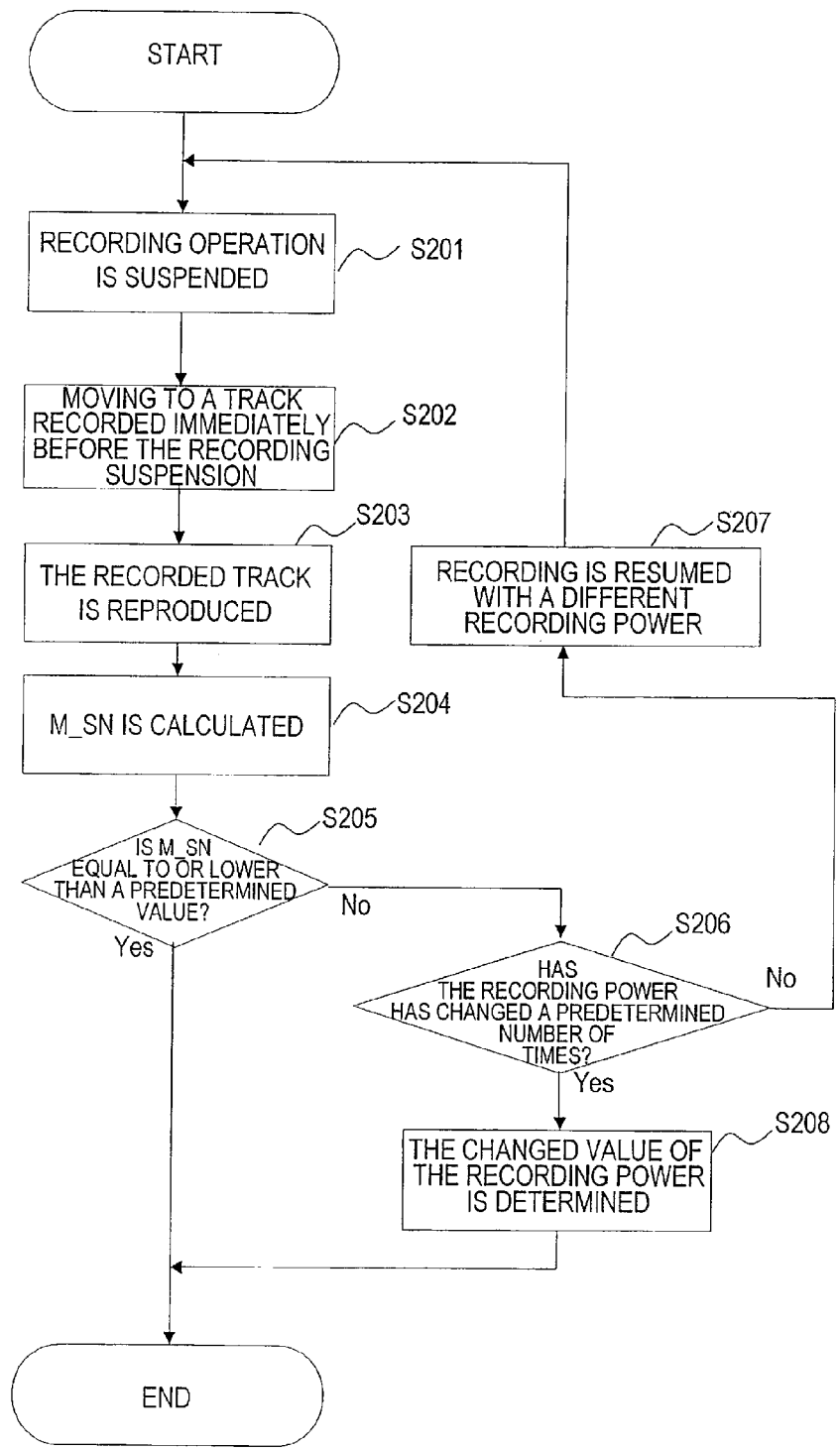
FIG. 24B is a flowchart showing a procedure of optimizing a recording power while user data is being recorded.

FIG. 24B is a flowchart showing a procedure of optimizing the recording power while user data is being recorded. The information recording medium controller 13 detects a temperature change, a recording position change or the like and once suspends the recording operation (step S201). The optical head 2 moves to an area in which data was recorded before the suspension of the recording operation (step S202). Next, recorded data is reproduced from a track near the area (step S203), and the index M_SN is calculated from the reproduced signal (step S204). Then, the calculated index M_SN is compared against a predetermined value (step S205). When the index M_SN is determined to be larger than the predetermined value, it is determined that the recording power is not appropriately set, and the recording operation is resumed with a different recording power (steps S206 and S207). After performing predetermined recording, the procedure is returned to step S201. When the index M_SN calculated in step S205 at the second time is determined to be smaller than the predetermined value, it is determined that the recording power is appropriately set, and the optimization is completed. When the index M_SN calculated in step S205 at the second time is determined to be larger than the predetermined value, the recording operation is resumed with a different recording power (step S206, S207).

The recording power is changed as follows. For example, the recording power is changed for the first time to be larger, and the index M_SN value calculated after the first time change is compared against the index M_SN value calculated before the first time change. When the index M_SN value calculated after the first time change is larger, the recording power is changed for the second time to be smaller than the recording power before the first time change. When the index M_SN value calculated after the first time change is smaller, the recording power is changed for the second time to be larger than the recording power after the first time change. When the index M_SN value even after the second time change is determined to be larger than the predetermined value, the recording power obtained under the condition providing the minimum index M_SN value among a total of three index M_SN values calculated is selected, for example.

Figure 24C:
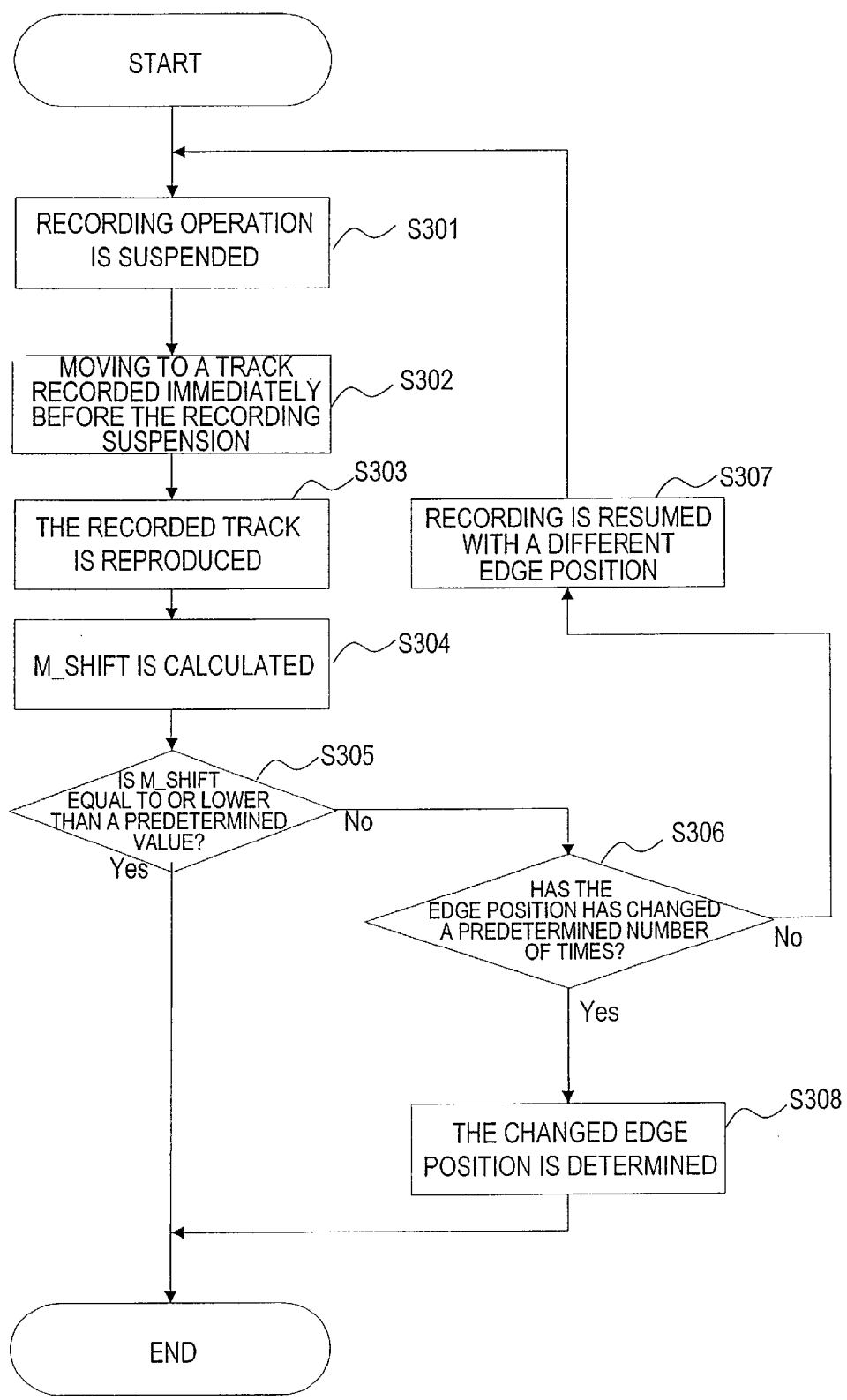
FIG. 24C is a flowchart showing a procedure of optimizing a recording edge position while user data is being recorded.

FIG. 24C is a flowchart showing a procedure of optimizing the recording edge position while user data is being recorded. The information recording medium controller 13 detects a temperature change, a recording position change or the like and once suspends the recording operation (step S301). The optical head 2 moves to an area in which data was recorded before the suspension of the recording operation (step S302). Next, recorded data is reproduced from a track near the area (step S303), and the index M_SHIFT is calculated from the reproduced signal (step S304). Then, the calculated index M_SHIFT is compared against a predetermined value (step S305). When the index M_SHIFT is determined to be larger than the predetermined value, it is determined that the recording edge position is not appropriately set, and the recording operation is resumed with a different recording edge position (steps S306 and S307). After performing predetermined recording, the procedure is returned to step S301. When the index M_SHIFT calculated in step S305 after the change is determined to be smaller than the predetermined value, it is determined that the recording edge position is appropriately set, and the optimization is completed. When the index M_SHIFT calculated in step S305 after the change is determined to be larger than the predetermined value, the recording operation is resumed with a different recording power (step S306, S307).

The recording edge position is changed as follows. For example, the recording edge position is changed for the first time to be delayed in the time axis direction, and the index M_SHIFT value calculated after the first time change is compared against the index M_SHIFT value calculated before the first time change. When the index M_SHIFT value calculated after the first time change is larger, the recording edge position is changed for the second time to be advanced in the time axis direction than the recording edge position before the first time change. When the index M_SHIFT value calculated after the first time change is smaller, the recording edge position is changed for the second time to be delayed in the time axis direction than the recording edge position after the first time change. When the index M_SHIFT value even after the second time change is determined to be larger than the predetermined value, the recording edge position obtained under the condition providing the minimum index M_SHIFT value among a total of three index M_SHIFT values calculated is selected, for example.

The recording power adjustment and the edge position adjustment may be performed in a row, either one of the adjustments maybe performed, or the adjustments may be alternately performed each time a temperature change, a recording position change or the like is detected.

The index M_SN and the index M_SHIFT may be calculated at the same time. Especially when the recording power readjustment and the edge position readjustment are performed in a row, the M_SHIFT used for determining the recording power may be used as the first calculation result of the M_SHIFT.

In this embodiment, the optical head does not return to the OPC area. Therefore, the time in which the recording is suspended can be shortened, and also the recording power and the edge position can be readjusted in an area close to an area in which user data is actually recorded. This realizes a more suitable readjustment than that obtained where the readjustment is performed in the OPC area.

With the conventional art, the recording power and the edge position are evaluated using different indices (jitter, error rate, symmetry, waveform amplitude, etc.). Because of this, processing for evaluating the recording power and processing for evaluating the edge position need to be performed separately. By contrast, according to the present invention, the recording power and the edge position can be evaluated using a statistical index obtained from the maximum likelihood decoding method, and thus the degree of deviation σ and the average value μ (FIG. 3) can be calculated at the same time. The present inventors found that the recording power heavily depends on the degree of deviation σ and that the edge position heavily depends on the average value μ. Therefore, the recording power and the edge position can be evaluated at the same time by one operation of calculating such a statistic index. Thus, the recording power and the edge position can be evaluated efficiently in a shorter time.

In the state where the correlation among the degree of deviation σ, the average value μ, the recording power and the edge position is not known, it cannot be found which of the recording power and the edge position is improper even by checking the degree of deviation σ and the average value μ. Therefore, the recording power and the edge position are adjusted at random, which is inefficient. By contrast, the present inventors found that the recording power heavily depends on the degree of deviation σ and that the edge position heavily depends on the average value μ. When the degree of deviation σ a is improper, the recording power needs to be adjusted; whereas when the average value μ is improper, the edge position needs to be adjusted. Thus, the recording parameters can be adjusted efficiently. When only one of the degree of deviation a σ and the average value μ is improper, it is not necessary to adjust both of the recording power and the edge position. Since only one parameter corresponding to the improper value needs to be adjusted, the recording parameter adjustment can be performed efficiently.

Figure 25:
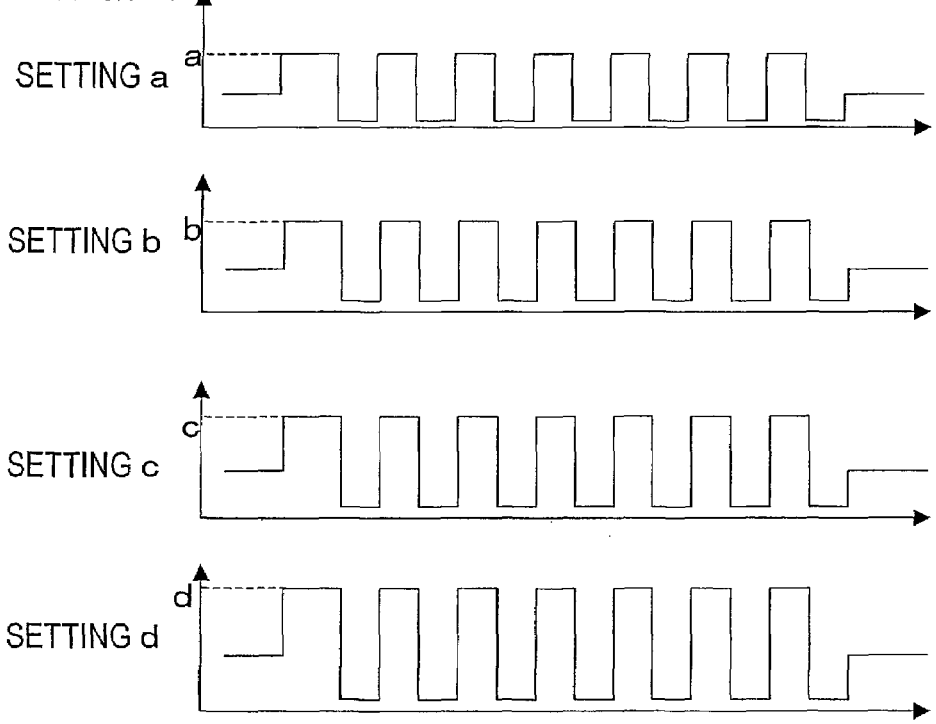
FIG. 25 shows recording power settings used for test recording at the time of recording power learning.
Figure 26:
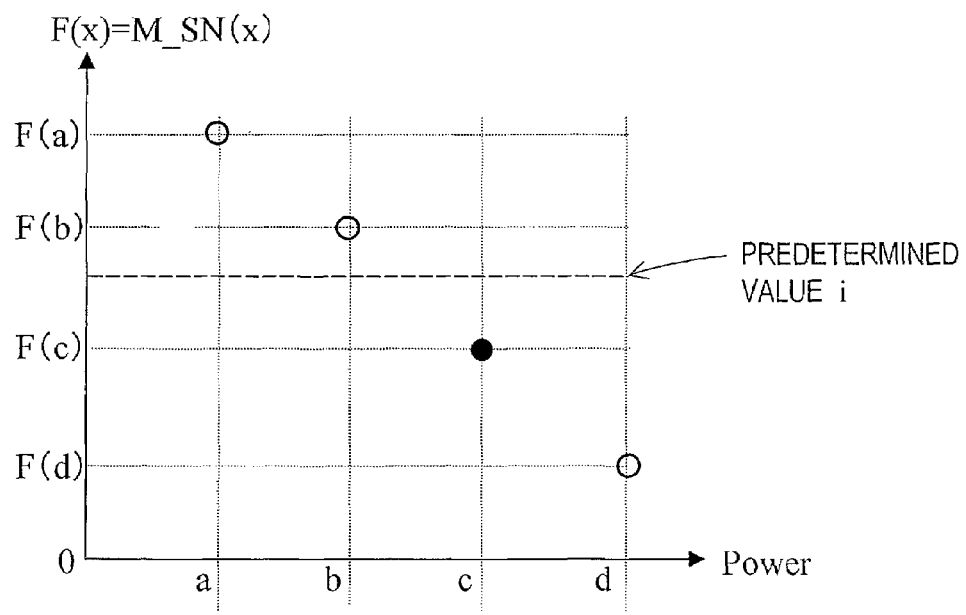
FIG. 26 shows values of the index M_SN obtained with the recording power settings shown in FIG. 25.
Figure 27:
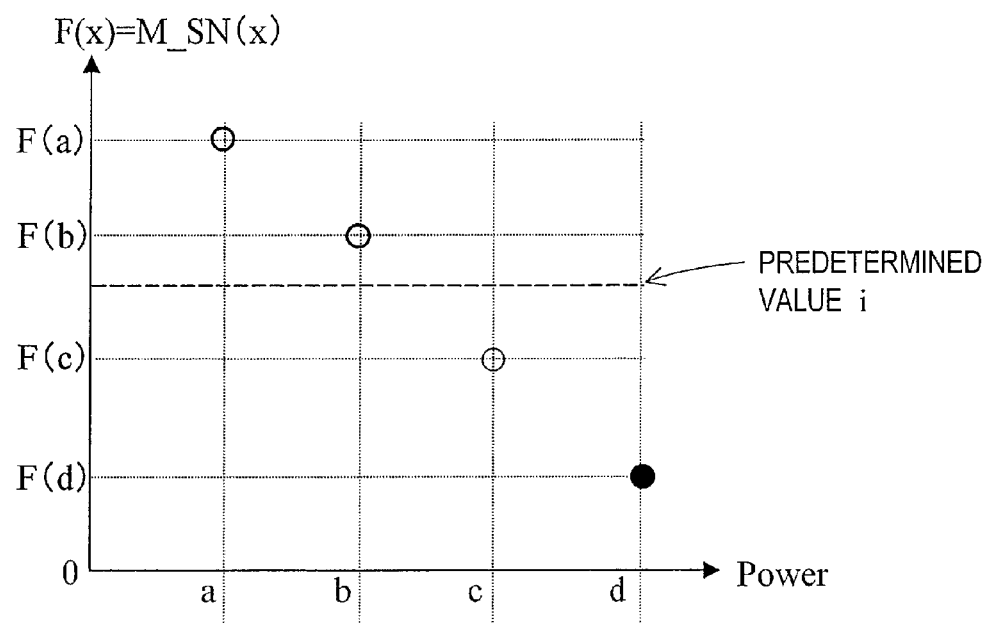
FIG. 27 shows values of the index M_SN obtained with the recording power settings shown in FIG. 25.

Now, with reference to FIGS. 25 through 27, the recording power adjustment will be further described. FIG. 25 shows recording power settings a through d used for test recording at the time of recording power learning. The recording power is increased in the order from the recording power setting a toward the recording power setting d. Recording is performed with each of the recording power settings a through d sequentially, the recorded information is reproduced, and the index M_SN values are calculated.

FIGS. 26 and 27 show the index M_SN values obtained with the recording power settings a through d. The vertical axis represents the index M_SN value, and the horizontal axis represents the recording power. In this example, the index M_SN value is smaller than a predetermined value i with the recording power settings c and d. Either one of the recording power settings c and d is selected. Here, the recording power setting d is larger than the recording power setting c. With an optical disc for repeated recording, as the recording power is smaller, the influence of the thermal damage at the time of repeated recording is reduced and the number of times that recording can be performed is increased. When the reduction in the influence of the thermal damage is regarded important, it is desirable to select the recording power setting c (black circle in FIG. 26). By contrast, when recording is performed in an area of the optical disc close to the outer periphery thereof with a power which is set by the test recording performed in an inner area of the optical disc, the effective radiation power may be decreased due to the warp of the optical disc. When there is a scratch or dust on the surface of the disc also, the effective radiation power may be decreased. When it is regarded important to provide a margin against such a reduction in the effective radiation power, it is desirable to select the recording power setting d (black circle in FIG. 27).

Figure 28:
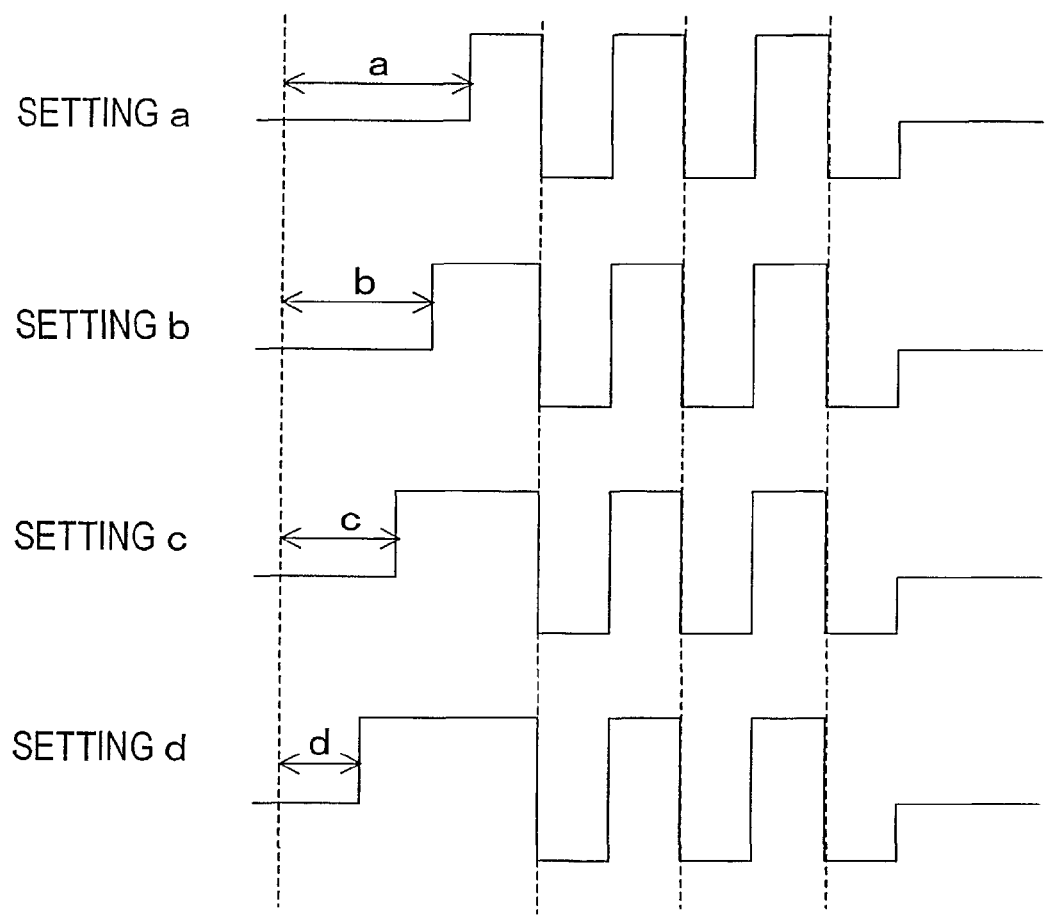
FIG. 28 shows recording waveform settings used for test recording at the time of recording waveform learning.

Now, with reference to FIGS. 28 through 31, the recording waveform adjustment will be further described. FIG. 28 shows recording waveform settings a through d used for test recording at the time of recording waveform learning. The start edge of the recording waveform is shifted from a rearward position to a forward position in the order from the recording waveform setting a toward the recording waveform setting d. Recording is performed with each of the recording waveform settings a through d sequentially, the recorded information is reproduced, and the index M_SHIFT values are calculated.

Figure 29:
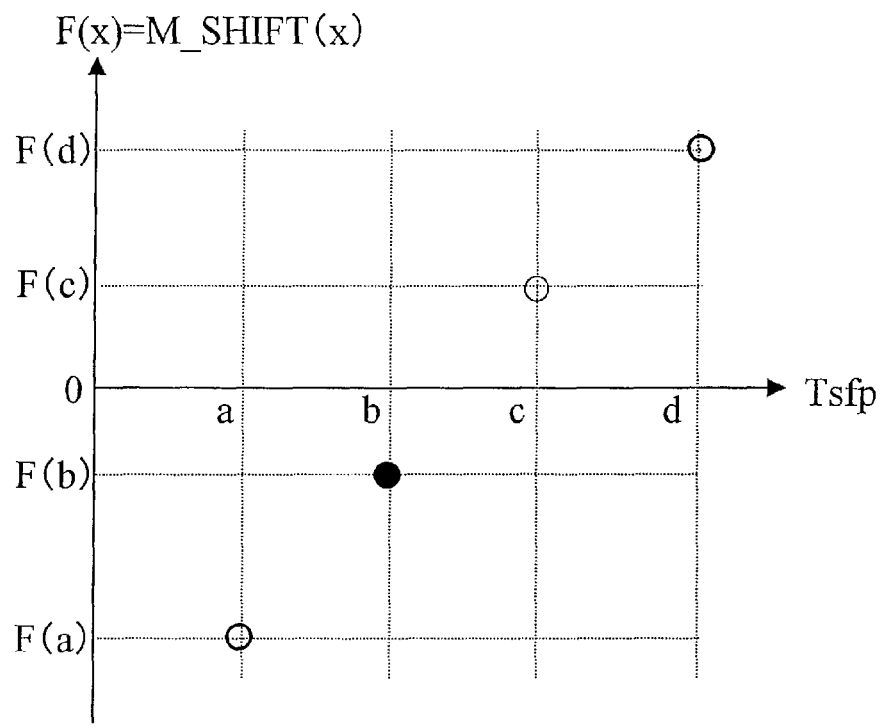
FIG. 29 shows values of the index M_SHIFT obtained with the recording waveform settings shown in FIG. 28.
Figure 30:
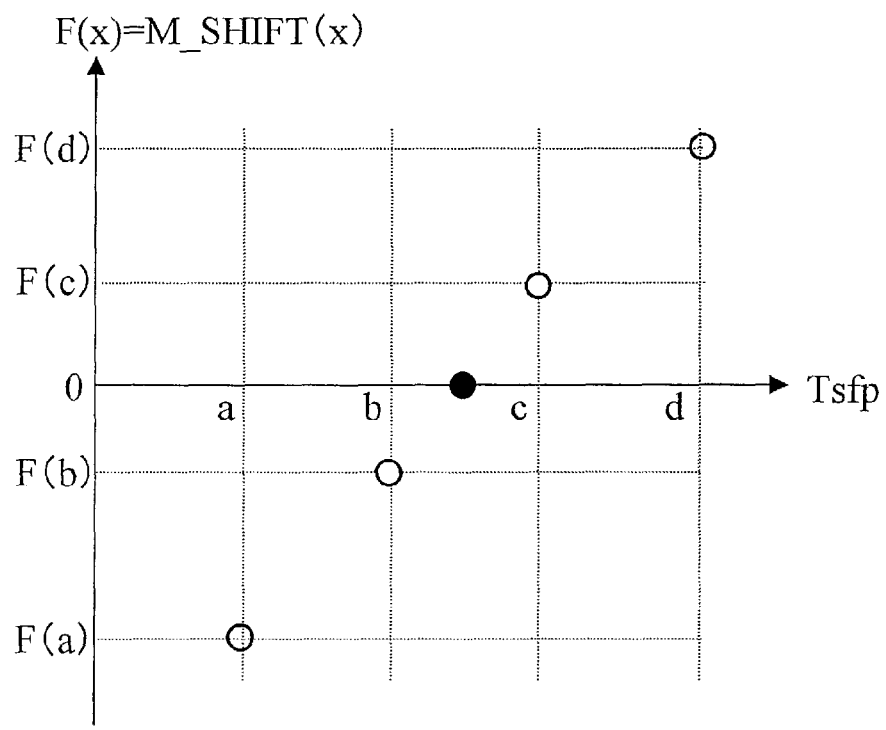
FIG. 30 shows values of the index M_SHIFT obtained with the recording waveform settings shown in FIG. 28.
Figure 31:
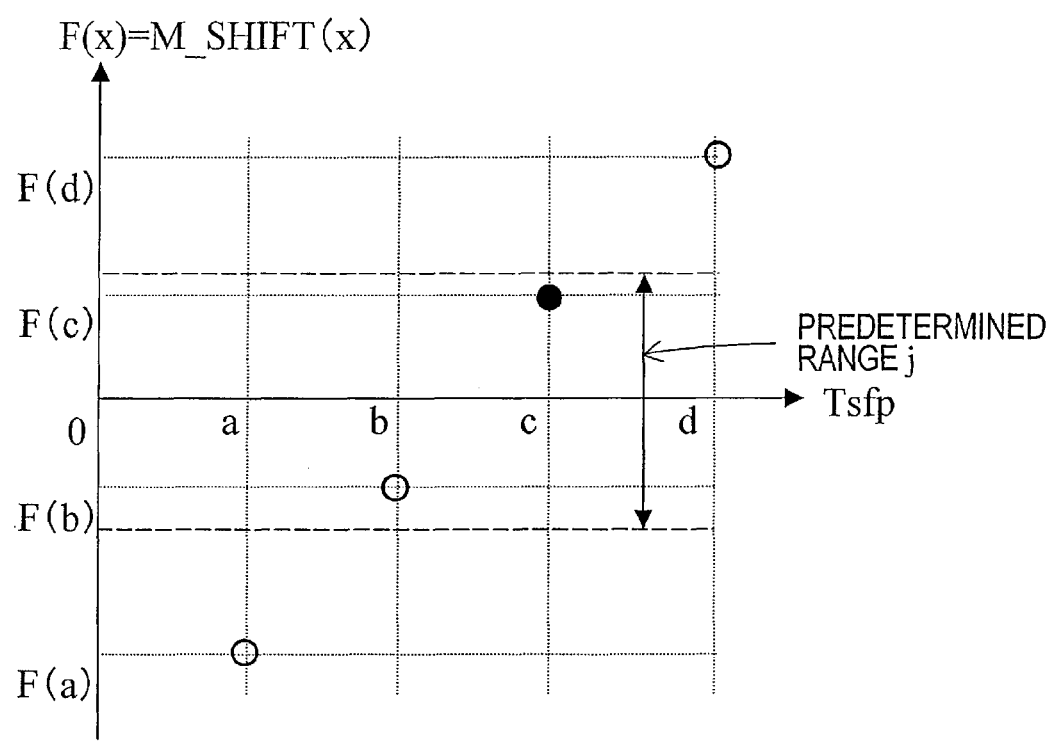
FIG. 31 shows values of the index M_SHIFT obtained with the recording waveform settings shown in FIG. 28.

FIGS. 29 through 31 show the index M_SHIFT values obtained with the recording waveform settings a through d. The vertical axis represents the index M_SHIFT value, and the horizontal axis represents the start edge position parameter Tsfp. As the index M_SHIFT value decreases (becomes closer to 0), the reliability level increases. Thus, among the recording waveform settings a through d, the recording waveform setting b corresponding to the minimum index M_SHIFT value (black circle in FIG. 29) is selected. In the case where the shift amount between the recording waveform settings a through d is not a minimum resolution, as shown in FIG. 30, the average value (black circle in FIG. 30) of the recording waveform settings b and c, which are on both sides of 0 of the index M_SHIFT value, may be selected as the recording waveform setting. In this way, the index M_SHIFT value can be made closer to 0.

When the index M_SHIFT value is within a predetermined range j close to 0 as shown in FIG. 31, recording with high reliability can be performed. In the embodiments of the present invention, the condition with which the index M_SHIFT value is equal to or less than a predetermined value is the condition under which the shift amount of the index M_SHIFT value from 0 (i.e., the absolute value of the index M_SHIFT value) is equal to or less than the predetermined value and also within the predetermined range j. In the example shown in FIG. 31, among the recording waveform settings b and c with which the index M_SHIFT value is within the predetermined range j, the recording waveform setting c with which the recording mark is longer is selected. When recording is performed in an area of the optical disc close to the outer periphery thereof with a power which is set by the test recording performed in an inner area of the optical disc, the effective radiation power may be decreased due to the warp of the optical disc. When there is a scratch or dust on the surface of the disc also, the effective radiation power may be decreased. When it is regarded important to provide a margin against such a reduction in the effective radiation power, it is desirable to select the recording waveform setting c.

The elements of the recording/reproduction apparatus 100 (FIG. 4) according to the present invention may be implemented by hardware or software. For example, the operation performed by at least one of the shaping section 8, the maximum likelihood decoding section 9, the reliability calculation section 10 and the adjusting section 104 may be realized by a computer-executable program (recording condition adjusting program).

The recording condition adjusting device 102 may be implemented by, for example, a semiconductor integrated circuit, a ROM having the recording condition adjusting program recorded thereon, a RAM having the recording condition adjusting program (pre)installed thereon, a RAM having a downloaded recording condition adjusting program installed thereon, or the like, or a combination thereof.

In the embodiments of the present invention, the recording section 103 and the recording section 303 record a piece of test information on the information recording medium 1 using a plurality of recording waveforms. Alternatively, the recording section 103 and the recording section 303 may record a plurality of pieces of test information on the information recording medium 1 using a plurality of recording waveforms. The recording section 103 and the recording section 303 may also record a piece of test information on the information recording medium 1 using a single recording waveform. Furthermore, the recording section 103 and the recording section 303 may record a plurality of pieces of test information on the information recording medium 1 using a single recording waveform.

In the embodiments of the present invention, the index M_SN is defined by, for example, expression 6 using the dispersion of |Pa−Pb|−Pstd. The present invention is not limited to this. For example, a value obtained by accumulatively adding |Pa−Pb| or |Pa−Pb|−Pstd a predetermined number of times may be used as the index.

In the embodiments of the present invention, the recording pulse described with reference to FIG. 2 is used. The present invention is not limited to this. For example, the present invention can be applied to control a recording waveform for a recording medium which does not require a cooling pulse (bottom power level). In this case, only a write power and an erase power are controlled.

In the embodiments of the present invention, the test signal is not limited to those described above. A test pattern may be a combination of a relatively long mark/space and a relatively short mark/space where the mark and the space have the same probability of occurrence. For example, such a test pattern is a repeat pattern of 8Tm3Ts8Tm8Ts3Tm8Ts or a repeat pattern of 7Tm2Ts7Tm7Ts2Tm7Ts.

In the embodiments of the present invention, the recording modulation rule and the PRML system are not limited to those described above. Various recording modulation rules and PRML systems of various characteristics may be combined. For example, the (1, 7) Run Length Limited code may be combined with the PR (1, 2, 1) ML system, the PR (1, 2, 2, 2, 1) ML system or the like. The 8-16 modulation code, which is used for CD and DVD, may be combined with the above-described PRML system.

In the embodiments of the present invention, the ranges in which powers Pwo, Peo and Pbo are searched for are not limited to those described above. For example, the range in which each power is searched for may be ±x % (e.g., x=10) around a recommended value. When an optimum point is not detected even in this range as shown in FIG. 18, the recommended value may be set as the upper or lower limit.

In the embodiments of the present invention, the index M_SHIFT is defined by expression 7 using an average value of |Pa−Pb|−Pstd. The present invention is not limited to this. For example, a value obtained by accumulatively adding |Pa−Pb| or |Pa−Pb|−Pstd values a predetermined number of times may be used as the index.

The power may be changed as follows in order to comply with a change in the environment or the like. After the recording waveform and the recording waveform are adjusted after the disc is mounted or immediately before data is recorded, the power is changed using M, which is the average of squares of M_SN and M_SHIFT, as the index. Owing to this, the M_SN or M_SHIFT can be improved.

Alternatively, the following adjustment may be performed in order to comply with a change in the environment or the like. After the recording waveform and the recording waveform are adjusted after the disc is mounted or immediately before data is recorded, the data recorded immediately previously is reproduced to detect M_SN and M_SHIFT. For example, if the M_SN is deteriorated, the power may be adjusted, whereas if the M_SHIFT is deteriorated, the recording waveform may be adjusted.

Similarly, after the recording waveform and the recording waveform are adjusted after the disc is mounted or immediately before data is recorded, the data recorded with the adjusted condition may be reproduced to detect M_SN and M_SHIFT. For example, if the M_SN is deteriorated, the power may be readjusted, whereas if the M_SHIFT is deteriorated, the recording waveform may be readjusted.

In the embodiments of the present invention, the recording condition is adjusted for recording data. The method for adjusting the recording condition is applicable to create a master ROM disc. Especially for performing mastering using a phase change recording layer, the technique for optimizing the recording condition in the embodiments of the present invention can be used to easily determine cutting conditions suitable to PRML reproduction.

M_SN is desirably 8% or lower, and M_SHIFT is desirably about 4% or lower.

The information recording medium may have a recording condition, with which the M_SN, M_SHIFT or M is equal to or less than a predetermined value, recorded beforehand in an area thereof saved for reproduction. Owing to this, even without test recording, recording which is more suitable to PRML reproduction than by the conventional art can be performed. With test recording, adjustment can be simplified; for example, it is sufficient to reproduce recorded data to merely confirm M_SN and M_SHIFT.

The information recording medium may have a recording condition, obtained by recording condition adjusting processing according to the present invention, recorded beforehand in a predetermined area (for example, a management information recording area) thereof. In this area of the information recording medium, at least one of the following recording conditions may be recorded: a recording condition with which the degree of deviation and the average value are smaller than predetermined values, a recording condition with which the degree of deviation is smaller than a predetermined value, a recording condition with which the average value is smaller than a predetermined value, and a recording condition with which a square root of the sum of the square of the degree of deviation and the square of the average value is smaller than a predetermined value. By referring to such information for the next test recording, the recording condition adjusting processing can be simplified.

Figure 32:
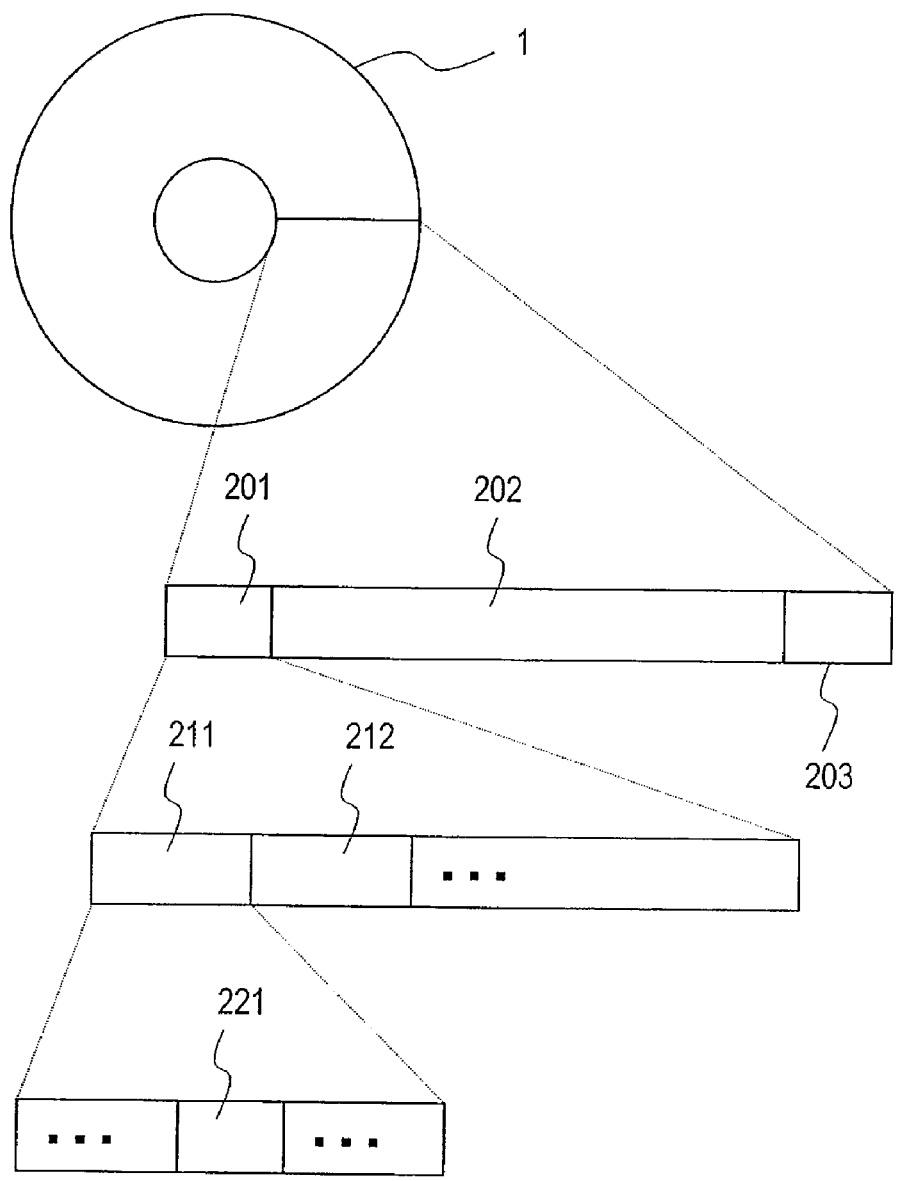
FIG. 32 shows a management information recording area of an information recording medium on which an optimized recording condition is to be recorded.
Figure 33:
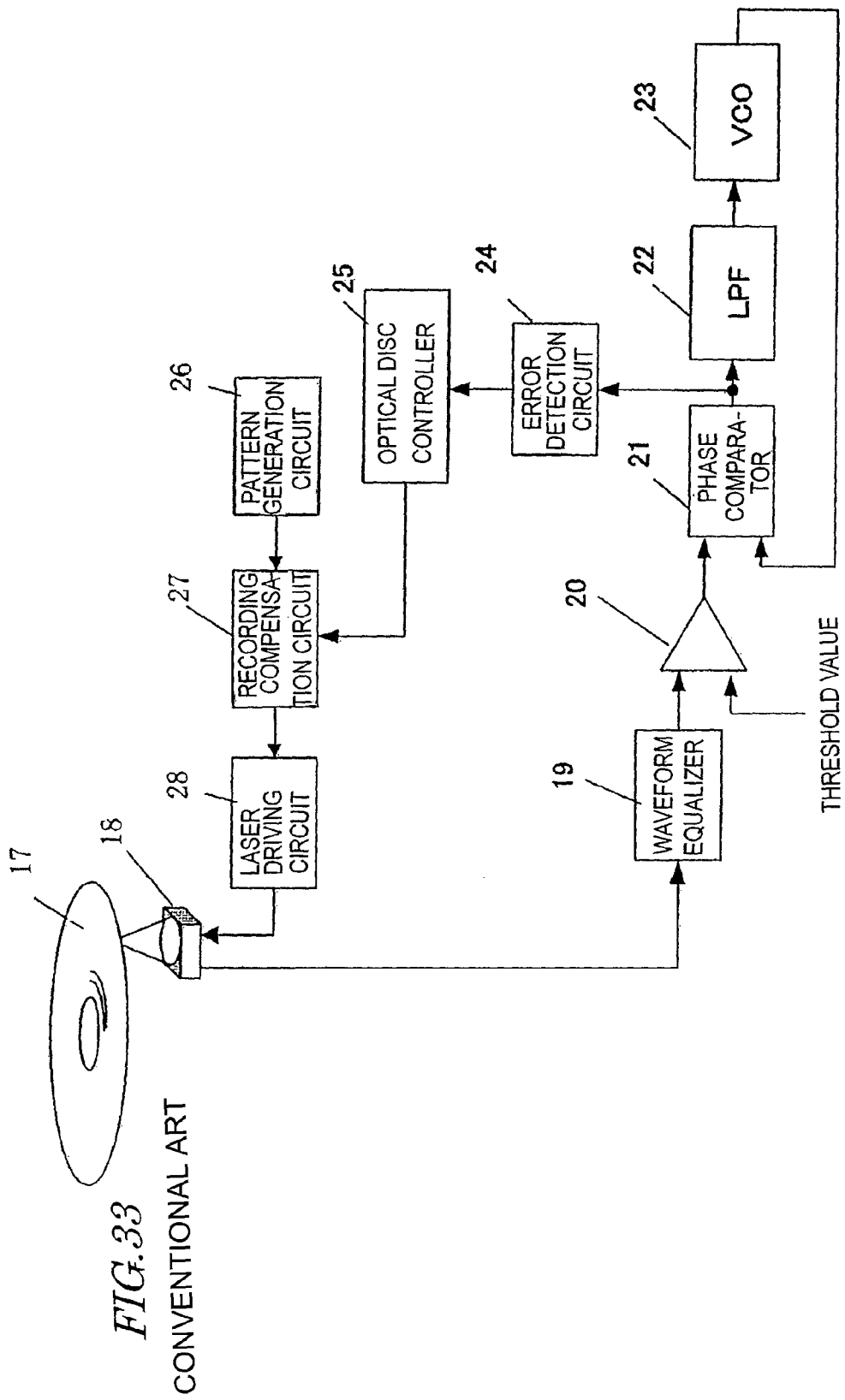
FIG. 33 shows a structure of a conventional optical disc drive.

FIG. 32 shows the information recording medium 1 on which the optimized recording condition is to be recorded. The information recording medium 1 includes a lead-in area 201, a user data area 202 and a lead-out area 203. The recording and reproduction of user data are performed to and from the user data area 202. Test recording is performed in the OPC (Optimum Power Calibration) area 212 included in the lead-in area 201. The lead-in area 201 and the lead-out area 203 each include a management information recording area 211 having a parameter necessary for accessing the information recording medium 1 stored therein. The management information recording area 211 includes a recording condition recording area 221 for recording a recording condition, and the optimized recording condition is recorded in the recording condition recording area 221.

According to the present invention, the recording condition adjusting processing may be performed in the order of, for example, test recording, reproduced signal quality evaluation, recording condition adjustment and then regular recording. In this case, before second information (user data) is recorded, first information (dummy data) is test-recorded. The first information and the second information may be different from each other. In another embodiment, the recording condition adjusting processing may be performed in the order of regular recording, recording condition updating, reproduced signal quality evaluation, recording condition adjustment and then regular recording. In this case, while first information (user data) is being recorded, the recording condition is updated in accordance with a temperature or humidity change, and second information (user data) is recorded with the updated recording condition. The first information may be re-recorded with a more suitable recording condition (first information=second information), or the second information may be recorded with the recording condition updated based on the first information (first information≠second information). In this manner, there are various relationships between the information used for the recording condition adjustment processing (first information) and the information recorded after the adjustment (second information). The present invention does not specify the relationship between the first information and the second information.

According to the present invention, the recording condition is adjusted by acquiring reproduced information obtained by reproducing information recorded with a predetermined recording condition and evaluating the reproduced information. Based on a first element obtained from an index used for the evaluation, the recording condition on the recording waveform is adjusted. Based on a second element independent from the first element and obtained from the index used for the evaluation, the recording condition on the recording position is adjusted. Indices usable for evaluating the recording condition include a plurality of independent elements, such as an index M and the like. Each element has a respective compatible adjustment target. The present invention defines extracting such elements, and also defines the relationship between such elements and the respective compatible adjusting targets.

Although certain preferred embodiments have been described herein, it is not intended that such embodiments be construed as limitations on the scope of the invention except as being as set forth in the appended claims. After reading the specific preferred embodiments herein, various other modifications and equivalents will be apparent to and can be readily made by those skilled in the art based on the description regarding the present invention and technological knowledge. All patents, patent applications and documents cited herein are incorporated herein by reference as if set forth fully herein.

INDUSTRIAL APPLICABILITY

The optical disc recording/reproduction apparatus according to the present invention optimizes the power and shape of a recording signal by using a reproduced signal evaluation index which is correlated with a decoding capability in a processing system which employs a maximum likelihood decoding method for processing a reproduced signal. As a result, a recorded state can be optimized and errors can be minimized during reproduction. The system of the present invention can detect a change in the reproduced waveform occurring in accordance with a change in the recording waveform with higher precision than the case by using a reproduced signal quality index such as jitter, asymmetry, BER or the like, which are conventionally used for recording waveform control. Therefore, the optimum recording parameter can be set with high precision. Since the optimum recording parameter can be set with high precision, performance degradation due to cross power can be minimized, which is useful for obtaining stable compatibility with optical disc drive apparatuses and optical disc mediums of the same standard.

Conventionally, a reproduced signal evaluation index such as jitter, asymmetry; BER or the like is used to determine and set an optimum recording parameter with high precision, but no appropriate parameter can be obtained with such an index.

According to the present invention, the recording parameter is controlled to optimize the recorded state by detecting the recorded state using a metric expected value error (index M_SN, index M_SHIFT, index M) of only a state transition pattern (pattern with the minimum Euclid distance) in the vicinity of an edge of a reproduced waveform, among a number of state transition patterns of the PRML algorithm. In order to control the recording power with higher precision, a test signal for use in test recording has a special pattern with which a change in the reproduced waveform corresponding to a change in the recording waveform can be detected with high precision.

The invention claimed is:

1. A recording condition adjusting device, comprising:
   a shaping section for receiving a first digital signal generated from an analog signal representing first information reproduced from an information recording medium and shaping a waveform of the first digital signal to generate a second digital signal;
   a maximum likelihood decoding section for performing maximum likelihood decoding on the second digital signal to generate a binary signal having maximum likelihood;
   a calculation section for calculating a first index representing likelihood of a first state transition sequence determined as having maximum likelihood by the maximum likelihood decoding section and a second index representing likelihood of a second state transition sequence determined as having second maximum likelihood by the maximum likelihood decoding section, and calculating a third index obtained based on a difference between the first index and the second index; and
   an adjusting section for adjusting a power of a recording signal for recording second information on the information recording medium based on a degree of deviation of the third index, wherein:
   the adjusting section adjusts an edge position of the recording signal based on an average value of the third index;
   where the degree of deviation is equal to or smaller than a predetermined value and an absolute value of the average value is larger than a predetermined value, the adjusting section adjusts the edge position with priority over the power of the recording signal so as to make the absolute value of the average value equal to or smaller than a predetermined value; and
   where the absolute value of the average value is equal to or smaller than the predetermined value and the degree of deviation is larger than the predetermined value, the adjusting section adjusts the power with priority over the edge position of the recording signal so as to make the degree of deviation equal to or smaller than the predetermined value.

2. The recording condition adjusting device of claim 1, wherein the adjusting section adjusts the power of the recording signal so as to decrease the degree of deviation.

3. The recording condition adjusting device of claim 1, wherein the adjusting section adjusts the power of the recording signal so as to make the degree of deviation equal to or smaller than a predetermined value.

4. The recording condition adjusting device of claim 1, wherein the adjusting section adjusts an edge position of the recording signal based on an average value of the third index.

5. The recording condition adjusting device of claim 4, wherein the adjusting section adjusts the edge position of the recording signal so as to decrease an absolute value of the average value.

6. The recording condition adjusting device of claim 4, wherein the adjusting section adjusts the edge position of the recording signal so as to make the absolute value of the average value equal to or smaller than a predetermined value.

7. A recording condition adjusting method, comprising the steps of:
   receiving a first digital signal generated from an analog signal representing first information reproduced from an information recording medium and shaping a waveform of the first digital signal to generate a second digital signal;
   performing maximum likelihood decoding on the second digital signal to generate a binary signal having maximum likelihood;
   calculating a first index representing likelihood of a first state transition sequence determined as having maximum likelihood and a second index representing likelihood of a second state transition sequence determined as having second maximum likelihood, and calculating a third index obtained based on a difference between the first index and the second index;
   adjusting a power of a recording signal for recording second information on the information recording medium based on a degree of deviation of the third index;
   adjusting an edge position of the recording signal based on an average value of the third index;
   adjusting the edge position with priority over the power of the recording signal so as to make the absolute value of the average value equal to or smaller than a predetermined value when the degree of deviation is equal to or smaller than a predetermined value and an absolute value of the average value is larger than a predetermined value; and
   adjusting the power with priority over the edge position of the recording signal so as to make the degree of deviation equal to or smaller than the predetermined value when the absolute value of the average value is equal to or smaller than the predetermined value and the degree of deviation is larger than the predetermined value.

8. A program stored on a non-transitory computer-readable medium for executing recording condition adjusting processing, wherein the recording condition adjusting processing comprises the steps of:
   receiving a first digital signal generated from an analog signal representing first information reproduced from an information recording medium and shaping a waveform of the first digital signal to generate a second digital signal;
   performing maximum likelihood decoding on the second digital signal to generate a binary signal having maximum likelihood;
   calculating a first index representing likelihood of a first state transition sequence determined as having maximum likelihood and a second index representing likelihood of a second state transition sequence determined as having second maximum likelihood, and calculating a third index obtained based on a difference between the first index and the second index;

adjusting a power of a recording signal for recording second information on the information recording medium based on a degree of deviation of the third index;

adjusting an edge position of the recording signal based on an average value of the third index;

adjusting the edge position with priority over the power of the recording signal so as to make the absolute value of the average value equal to or smaller than a predetermined value when the degree of deviation is equal to or smaller than a predetermined value and an absolute value of the average value is larger than a predetermined value; and adjusting the power with priority over the edge position of the recording signal so as to make the degree of deviation equal to or smaller than the predetermined value when the absolute value of the average value is equal to or smaller than the predetermined value and the degree of deviation is larger than the predetermined value.

9. An information recording apparatus, comprising:
a reproduction section for generating a first digital signal from an analog signal representing first information reproduced from an information recording medium; and
a recording condition adjusting device;
wherein the recording condition adjusting device includes:
a shaping section for receiving the first digital signal and shaping a waveform of the first digital signal to generate a second digital signal;
a maximum likelihood decoding section for performing maximum likelihood decoding on the second digital signal to generate a binary signal having maximum likelihood;
a calculation section for calculating a first index representing likelihood of a first state transition sequence determined as having maximum likelihood by the maximum likelihood decoding section and a second index representing likelihood of a second state transition sequence determined as having second maximum likelihood by the maximum likelihood decoding section, and calculating a third index obtained based on a difference between the first index and the second index; and
an adjusting section for adjusting a power of a recording signal for recording second information on the information recording medium based on a degree of deviation of the third index;

the information recording apparatus further comprising a recording section for recording the second information on the information recording medium based on a result of the adjustment of the power of the recording signal, wherein:
the adjusting section adjusts an edge position of the recording signal based on an average value of the third index;
where the degree of deviation is equal to or smaller than a predetermined value and an absolute value of the average value is larger than a predetermined value, the adjusting section adjusts the edge position with priority over the power of the recording signal so as to make the absolute value of the average value equal to or smaller than a predetermined value; and
where the absolute value of the average value is equal to or smaller than the predetermined value and the degree of deviation is larger than the predetermined value, the adjusting section adjusts the power with priority over the edge position of the recording signal so as to make the degree of deviation equal to or smaller than the predetermined value.

10. A recording condition adjusting method of acquiring reproduced information obtained by reproducing information recorded with a predetermined recording condition and evaluating the reproduced information to adjust the recording condition, the method comprising:
a power adjusting step of adjusting a recording power based on a first element obtained from an index used for the evaluation; and
a position adjusting step of adjusting a recording position based on a second element obtained from the index used for the evaluation before or after the power adjusting step, wherein:
where the first element fulfills a first condition and the second element does not fulfill the second condition, the recording position is adjusted; and
where the first element does not fulfill the first condition and the second element fulfills the second condition, the recording power is adjusted.

11. The recording condition adjusting method of claim 10, wherein:
the index used for the evaluation is a statistical index;
the first element is information on the degree of deviation of the index; and
the second element is information on the average value of the index.

* * * * *

UNITED STATES PATENT AND TRADEMARK OFFICE
CERTIFICATE OF CORRECTION

| | | |
|---|---|---|
| PATENT NO. | : 8,000,197 B2 | Page 1 of 1 |
| APPLICATION NO. | : 11/995549 | |
| DATED | : August 16, 2011 | |
| INVENTOR(S) | : Mamoru Shoji et al. | |

It is certified that error appears in the above-identified patent and that said Letters Patent is hereby corrected as shown below:

Cover Page, item (57), lines 1-2, "representing represents" should read -- representing --.

Signed and Sealed this
Fourteenth Day of February, 2012

David J. Kappos
*Director of the United States Patent and Trademark Office*